Feb. 11, 1964 F. P. GOHOREL 3,121,141

TELEPHONIC SYSTEMS

Filed Jan. 8, 1959 19 Sheets-Sheet 1

Inventor
F. P. GOHOREL

By Robert Harding Jr.
Attorney

| | CONTACTS | | | |
|---|---|---|---|---|
| | m1 | m2 | m3 | m4 |
| 1H | | | | G' |
| 1B | | C' | | G' |
| 2H | | | F' | |
| 2B | | C' | F' | |
| 3H | | | F' | G' |
| 3B | | C' | F' | G' |
| 4H | | | E' | |
| 4B | | C' | E' | |
| 5H | | | E' | G' |
| 5B | | C' | E' | G' |
| 6H | | | I' | |
| 6B | | C' | I' | |
| 7H | | | I' | G' |
| 7B | | C' | I' | G' |
| 8H | | D' | | G' |
| 8B | | H' | | G' |
| 9H | | D' | F' | |
| 9B | | H' | F' | |
| 10H | | D' | F' | G' |
| 10B | | H' | F' | G' |
| 11H | | D' | E' | |
| 11B | | H' | E' | |
| 12H | | D' | E' | G' |
| 12B | | H' | E' | G' |
| 13H | | D' | I' | |
| 13B | | H' | I' | |
| 14H | | | | |
| 14B | B' | | | |

Inventor
F.P. GOHOREL
By Robert Harding Jr.
Attorney

Feb. 11, 1964 F. P. GOHOREL 3,121,141

TELEPHONIC SYSTEMS

Filed Jan. 8, 1959 19 Sheets-Sheet 3

Inventor
F. P. GOHOREL

By [signature]
Attorney

Feb. 11, 1964 F. P. GOHOREL 3,121,141

TELEPHONIC SYSTEMS

Filed Jan. 8, 1959 19 Sheets-Sheet 4

Inventor
F. P. GOHOREL

By Robert Harding Jr.
Attorney

Feb. 11, 1964 F. P. GOHOREL 3,121,141

TELEPHONIC SYSTEMS

Filed Jan. 8, 1959 19 Sheets-Sheet 5

Inventor
F. P. GOHOREL

By Robert Harding Jr.
Attorney

Inventor
F. P. GOHOREL
By Robert Harding Jr.
Attorney

Inventor
F.P. GOHOREL
By Robert Harding Jr.
Attorney

Inventor
F. P. GOHOREL
By Robert Harding Jr.
Attorney

Inventor
F.P. GOHOREL
By Robert Harding Jr.
Attorney

Inventor
F.P. GOHOREL
By Robert Harding Jr.
Attorney

Inventor
F.P. GOHOREL
By Robert T. Harding Jr.
Attorney

| | CONCENTRATOR No. 1. | | | | CONCENTRATOR No. 2. | | | |
|---|---|---|---|---|---|---|---|---|
| | SELECTORS 1 TO 4 | | | | SELECTORS 5 TO 8 | | | |
| | m1 | m2 | m3 | m4 | m1 | m2 | m3 | m4 |
| 1H | | | | G' | | D' | | G' |
| 1B | | C' | | G' | | H' | | G' |
| 2H | | | F' | | | D' | F' | |
| 2B | | C' | F' | | | H' | F' | |
| 3H | | | F' | G' | | D' | F' | G' |
| 3B | | C' | F' | G' | | H' | F' | G' |
| 4H | | | E' | | | D' | E' | |
| 4B | | C' | E' | | | H' | E' | |
| 5H | | | E' | G' | | D' | E' | G' |
| 5B | | C' | E' | G' | | H' | E' | G' |
| 6H | | | I' | | | D' | I' | |
| 6B | | C' | I' | | | H' | I' | |
| 7H | | | | | | | | |
| 7B | B' | | | | B' | | | |

Inventor
F. P. GOHOREL
By Robert Harding Jr.
Attorney

FIG.13.

| 1ST SECTION. | WIRE | RELAYS tf, | CONTACT OF RELAYS tf. | RELAYS 4b,4c. | CONTACT RELAYS 4b,4c. | SELECTOR TERMINAL |
|---|---|---|---|---|---|---|
| 1 | e | 1<br>2 | 2<br>2 | | | 1<br>5 |
| 1 | d | 1<br>2 | 6<br>6 | | | 1<br>5 |
| 1 | p | | | 4c<br>4b | 1<br>3 | 1<br>5 |
| 2 | e | 1<br>2 | 3<br>3 | | | 2<br>6 |
| 2 | d | 1<br>2 | 7<br>7 | | | 2<br>6 |
| 2 | p | | | 4c<br>4b | 2<br>4 | 2<br>6 |
| 3 | e | 1<br>2 | 4<br>4 | | | 3<br>7 |
| 3 | d | 1<br>2 | 8<br>8 | | | 3<br>7 |
| 3 | p | | | 4c<br>4b | 3<br>5 | 3<br>7 |
| 4 | e | 1<br>2 | 5<br>5 | | | 4<br>8 |
| 4 | d | 1<br>2 | 9<br>9 | | | 4<br>8 |
| 4 | p | | | 4c<br>4b | 4<br>6 | 4<br>8 |

Inventor
F.P. GOHOREL
By Robert Harding Jr.
Attorney

Inventor
F.P. GOHOREL
By [signature]
Attorney

Feb. 11, 1964 F. P. GOHOREL 3,121,141

TELEPHONIC SYSTEMS

Filed Jan. 8, 1959 19 Sheets-Sheet 15

Inventor
F.P. GOHOREL

By Robert Harding Jr.
Attorney

Inventor
F.P. GOHOREL
By Robert Harding Jr.
Attorney

Inventor
F. P. GOHOREL
By Robert Harding Jr.
Attorney

Inventor
F.P. GOHOREL
By Robert Harding
Attorney

Inventor
F. P. GOHOREL
By Robert Harding Jr.
Attorney

United States Patent Office 3,121,141
Patented Feb. 11, 1964

3,121,141
TELEPHONIC SYSTEMS

Fernand Pierre Goborel, Antony, France, assignor to International Standard Electric Corporation, New York, N.Y., a corporation of Delaware Filed Jan. 8, 1959, Ser. No. 785,653
Claims priority, application France Jan. 14, 1958
17 Claims. (Cl. 179—18)

This invention is directed to improvements in automatic telephone switching systems and deals more particularly with the problems of relieving the overload of telephone networks. The number of subscribers increases steadily; in the big cities, the number of incoming lines in an exchange is very high which leads to a certain number of difficulties and particularly the overloading of the income distributors. Hence, it is of great interest to scatter all over the telephone network unstaffed small exchanges or "concentrators" linked together by means of a small number of lines which connect them to a more important office. The subscribers' lines are thus shorter, their concentration is lower, which yields an efficient saving. On the other hand, the elements used in automatic switching have reached a sufficient degree of reliability to warrant their use in small exchanges without supervision. Whatever be the importance and the density of a network, the curtailing of expenses in telephone leads is always important and the use of automatic concentrator equipments applies to small networks as well as intermediate and large ones.

In prior art disclosures, an automatic switching system has been described using cross-bar switches with one or more common control devices (markers) in each selection stage. These systems call for elements which have shown great stability and need very little maintenance; some of their design characteristics allow these systems to be easily decentralized, which makes them suitable for the relieving of the network overload.

A feature of the invention is to provide a telephone switching system with exchanges and distant concentrators, formed by final selectors having a "local" part located at the exchange, and a "distant" part located at the concentrator, the local part including all the elements of a usual final selector except the talking wires which are in the distant part, and operating in the same manner as in the case of a local subscriber, arrangements being provided to transmit from the concentrator to the exchange the identity of the calling subscriber and to mark his position on the outlets of the final selector local part, arrangements being also provided to transmit from the exchange to the concentrator the information relative to the position of the final selector local part, so as to set the distant part on a similar position.

The fact that the selection process is carried out at the exchange without any difference between a local and a distant subscriber brings several advantages. The idle or busy test of the called subscriber, the metering, the transmission of the category are effected in the same way as for an ordinary subscriber by the final selector local part. At the concentrators, there may be provided either lines grouped under the same number (PBX) or party lines; the way of using a line may also be modified. If distant concentrators have to be connected to existing exchanges, only slight modifications have to be carried out; final selector frames similar to those already provided may be used; with the removal of the talking wires and the addition of the equipments to transmit and receive the necessary information between exchange and concentrator.

A further feature of the invention is the fact that when the local portion of the final selector is set on a position corresponding to the called subscriber of the concentrator, a send-receive device is put into operation and sends to the concentrator the position information of said local portion, said information being received on a send-receive device located at the concentrator and controlling the setting of the final selector distant portion on the called subscriber.

A further feature of the invention is the fact that when a subscriber of a concentrator initiates a call, said subscriber is identified by any suitable means and that the send-receive device of the concentrator sends to the send-receive device of the exchange information characterizing the said subscriber, the position of this latter being then marked on the outlets of the final selector local portion and this marking initiating the normal hunting process of the calling line, the final selector local portion prescribing its position to the distant portion, following a procedure defined in the preceding feature.

A further feature of the invention is the fact that when the final selector distant portion is set on a position corresponding to that of the local portion, i.e. on the subscriber, calling or called, said subscriber is connected to the exchange in the same way as for a local subscriber, this arrangement allowing, besides other advantages, omission of the supply from the concentrator and the sending from the exchange of a supply current, the type of which permits selecting a subscriber among several subscribers of a party line.

A further feature of the invention is that the transmission of information between exchange and concentrator may be carried out either on one of the junction circuits normally employed for the talking path, or on a special circuit provided for this case and that the junction circuit is chosen by a distributor located at the concentrator if the information is sent from the concentrator to the exchange, while a junction circuit is chosen by the penultimate selector (call hunter or fifty selector) if the information is sent from the exchange to the concentrator; as a result of this arrangement, two junction circuits, which are generally different, are successively called in case a subscriber of the concentrator initiates a call, one of the circuits being used to transmit the identity of the calling subscriber to the exchange and the other to send to the concentrator the position information of the final selector local portion.

A further feature of the invention is the fact that the send-receive devices are busied only during the time strictly necessary to fulfill their function, so as to reduce their number and the cost of the plant, a simplified equipment (junctor) being provided at each junction circuit terminal for the seizure and clearing signals.

A further feature of the invention is the use of a marking equipment to remember the calling subscriber identification code in case of a call initiated by the concentrator, allowing thus a quick clearing of the send-receive device at the exchange, even if the call cannot be extended immediately.

A further feature of the invention is the fact that after transmission of the calling subscriber's identity, from the concentrator to the exchange, the send-receive devices of the exchange and the concentrator remain in the busy condition of a new call initiated from the concentrator, as long as the given call has not been extended, the different calls being thus successively extended.

A further feature of the invention is the fact that during the time which elapses between the setting of the final selector local portion and that of the distant portion, the line wires are looped at the exchange to keep the selection stages seized, so that if the calling subscriber does not carry on with his call, the line wires are opened after the setting of the final selector distant portion, which initiates automatically the clearing out of all the seized apparatus.

A further feature of the invention is the fact that the clearing signal sent from the exchange to the concentrator is received on an electronic tube, delayed by any suitable means, the operation of this tube occurring only after a given time so that undesirable clearing due to accidental reasons is avoided.

Another feature of the invention is the fact that when either of the junction circuit terminals sends a seizure signal and does not receive afterwards a dial tone signal to send the identification code, clearing of the equipments located at this terminal is achieved; in case of a call initiated by the concentrator, another junction circuit is selected; in case of a call initiated by the exchange, the selection of the junction circuit cannot be modified, the fault being indicated by any suitable means.

A further feature of the invention is the fact that when the concentrator and the exchange send simultaneously a seizure signal, none of the receivers operates, the dial tone signal to send the identification code being sent neither to the exchange nor to the concentrator, initiating the different clearing operations, one of the terminals being cleared first and receiving correctly the seizure signal.

A further feature of the invention is the fact that when when the same final selector frame serves two or more different concentrators, one or more final selectors are allotted to each concentrator, and after analysing the calling subscriber's identity information, the identity of the concentrator to which the subscriber is connected is deduced and only the final selectors serving said concentrator are put in the calling condition on primary portion outlets or on the overflow portion.

When a final selector frame serves concentrators handling low traffic, a number of selectors smaller than than of a frame having access to local subscribers only, has to be provided. Under these circumstances, some of the final selectors of this frame may be graded on two or more primary portions (common), the others remaining individual to each portion (individual).

A further feature of the invention is to effect the grading of a final selector on the outlets of two or more primary portions to the line wire only, the controlling wires provided to extend the call to the primary portions and the overflow portions remaining individual to each portion and being broken either by contacts of the final selector hold magnet or by contacts of a relay operating with said magnet, this arrangement allowing the use of the same set of control wires for all the selectors of the frame, common or individual.

A further feature of the invention is to use the concentrator with a step-by-step exchange, substituting for the last selection stage or stages of said exchange a line selection element associated with a test device as well as a setting device, the test device being employed in case of a call initiated by the concentrator to single out a call hunter associated with a circuit and a first local selector, the setting device being employed in case of a call to the concentrator to receive the number under the form of numerical pulses and to retransmit it to the marker under the coded form, this inclusion of the concentrator in a step-by-step exchange calling only for slight modifications.

In case the distance between exchange and concentrator is such that the microphone supply becomes too low, it is possible to add in the junction circuit a supply at the concentration point by including in series a D.C. supply. All necessary arrangement should then be provided to have the added supply in the correct direction i.e. so as to add the voltage to that of the exchange supply, the added supply operating thus as a booster.

A further feature of the invention is that when the subscriber connected to the concentrator is in the calling condition, and the microphone supply current is reversed following the answer of the called subscriber, a suitable device located on the line detects this reversal and operates due to the difference between the exchange supply voltage and the booster voltage to reverse the direction of the booster so as to be in series with the exchange supply.

A further feature of the invention is to provide in series with one of the line wires a non-linear element and to connect the booster across this element so that at the reversal of current caused by the called subscriber's answer, the voltage across the non-linear element remains practically constant even if the current of the local supply varies, which allows the use of a smaller and consequently more economical supply.

The above mentioned and other features and objects of this invention and the manner of attaining them will become more apparent, and the invention itself will be best understood, by reference to the following description of an embodiment of the invention taken in conjunction with the accompanying drawings comprising FIGURES 1 to 20, wherein.

Figures 2, 6:
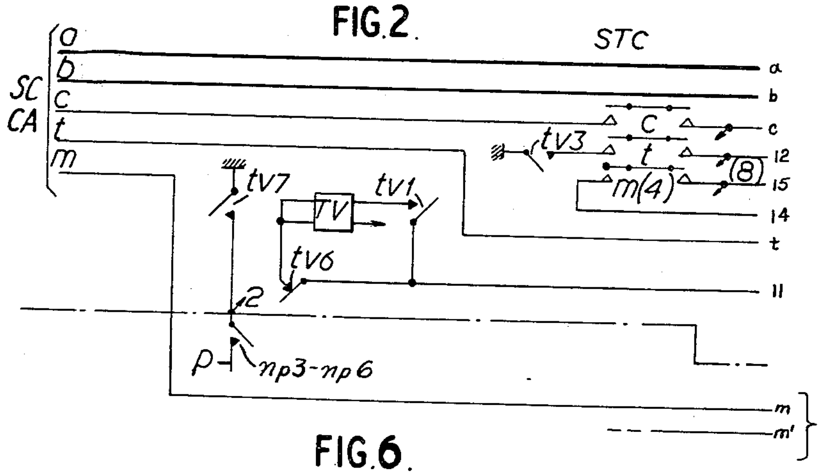
FIG. 2 shows the circuit of a portion of the local part of a final selector, i.e. the part which lies in the exchange.
Figure 3A:
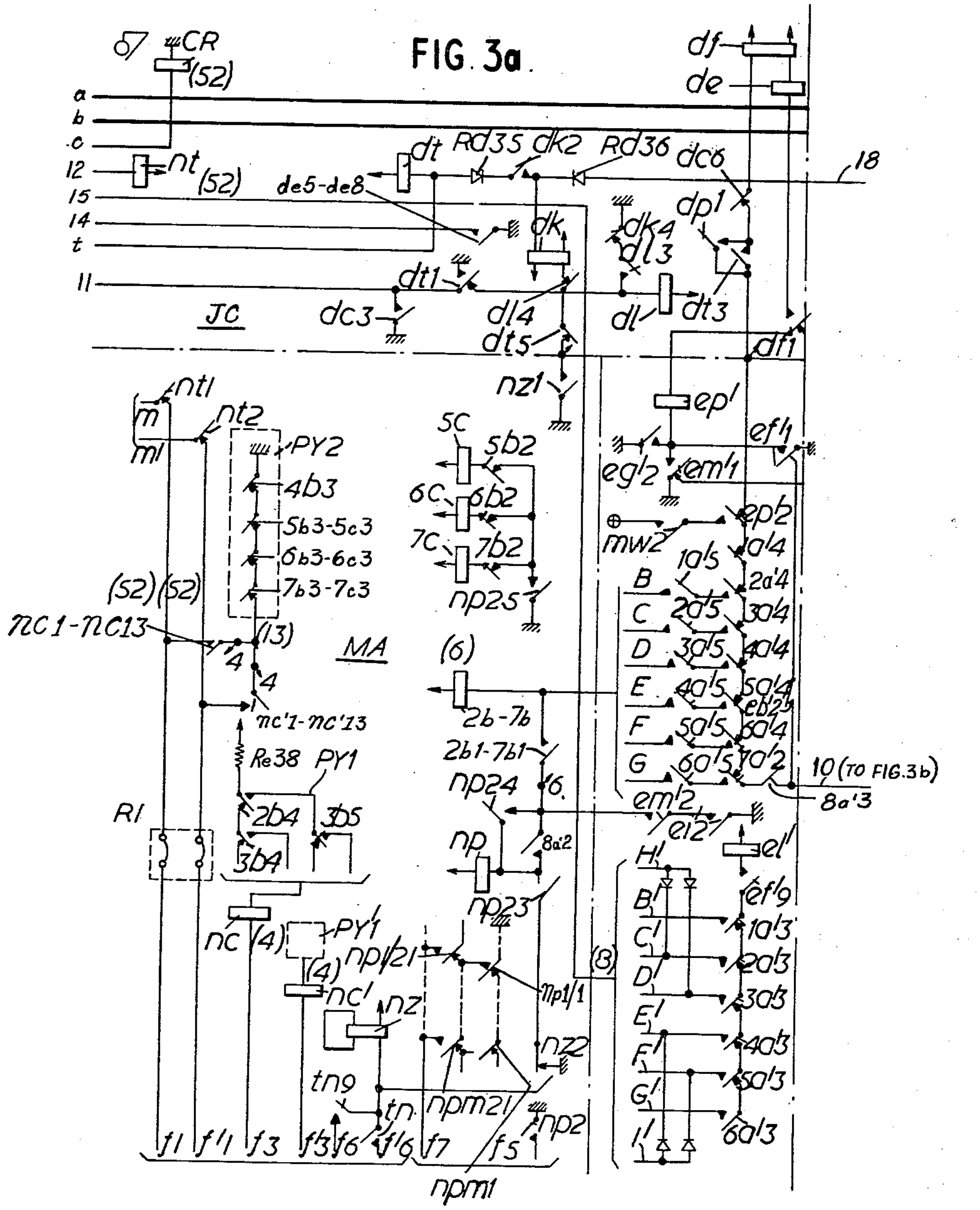
Figure 3B:
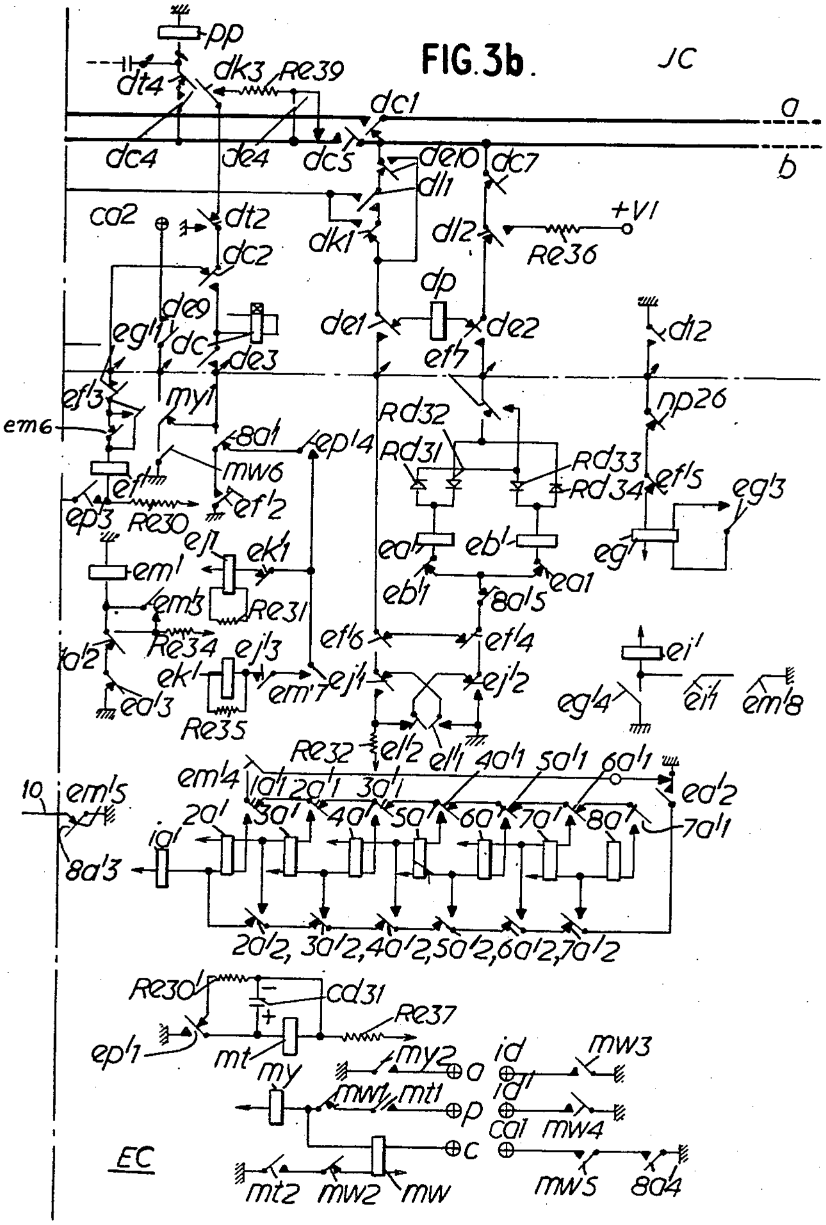
Figure 4A:
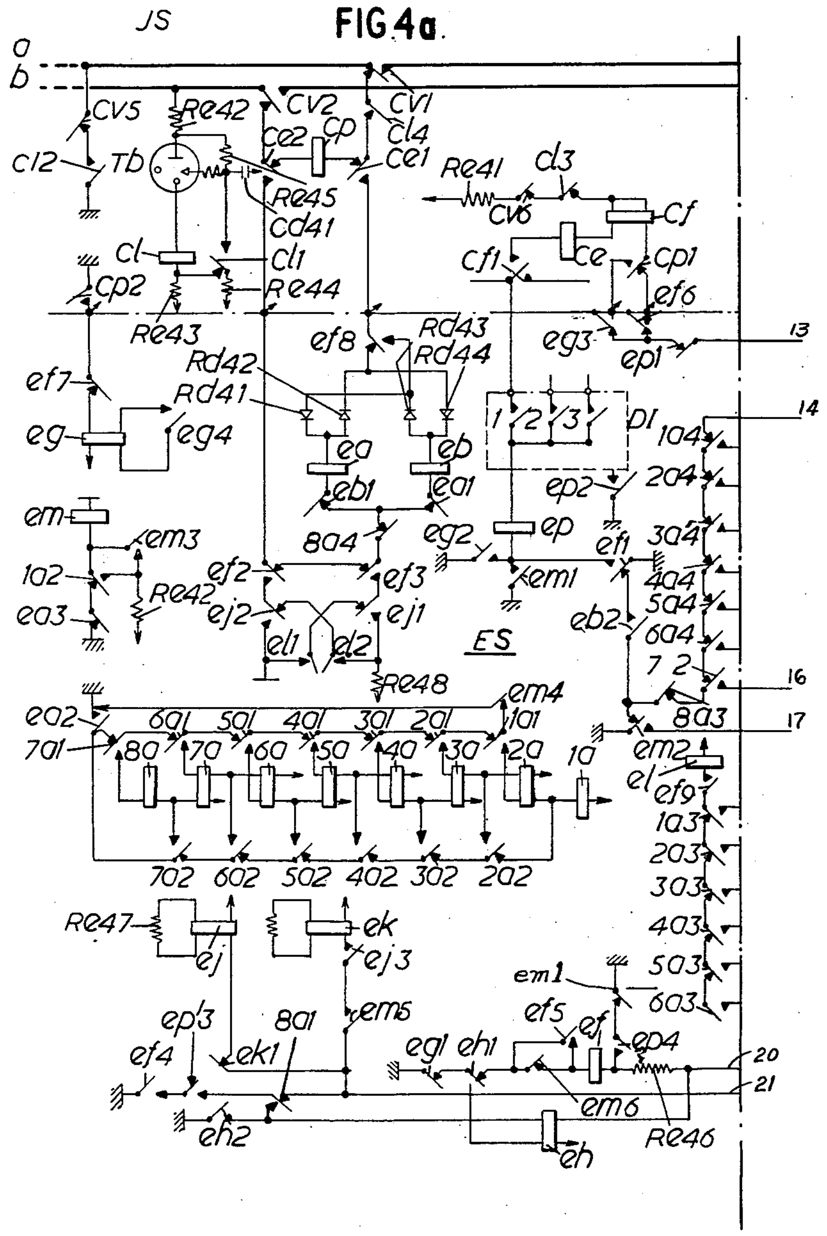
Figure 4B:
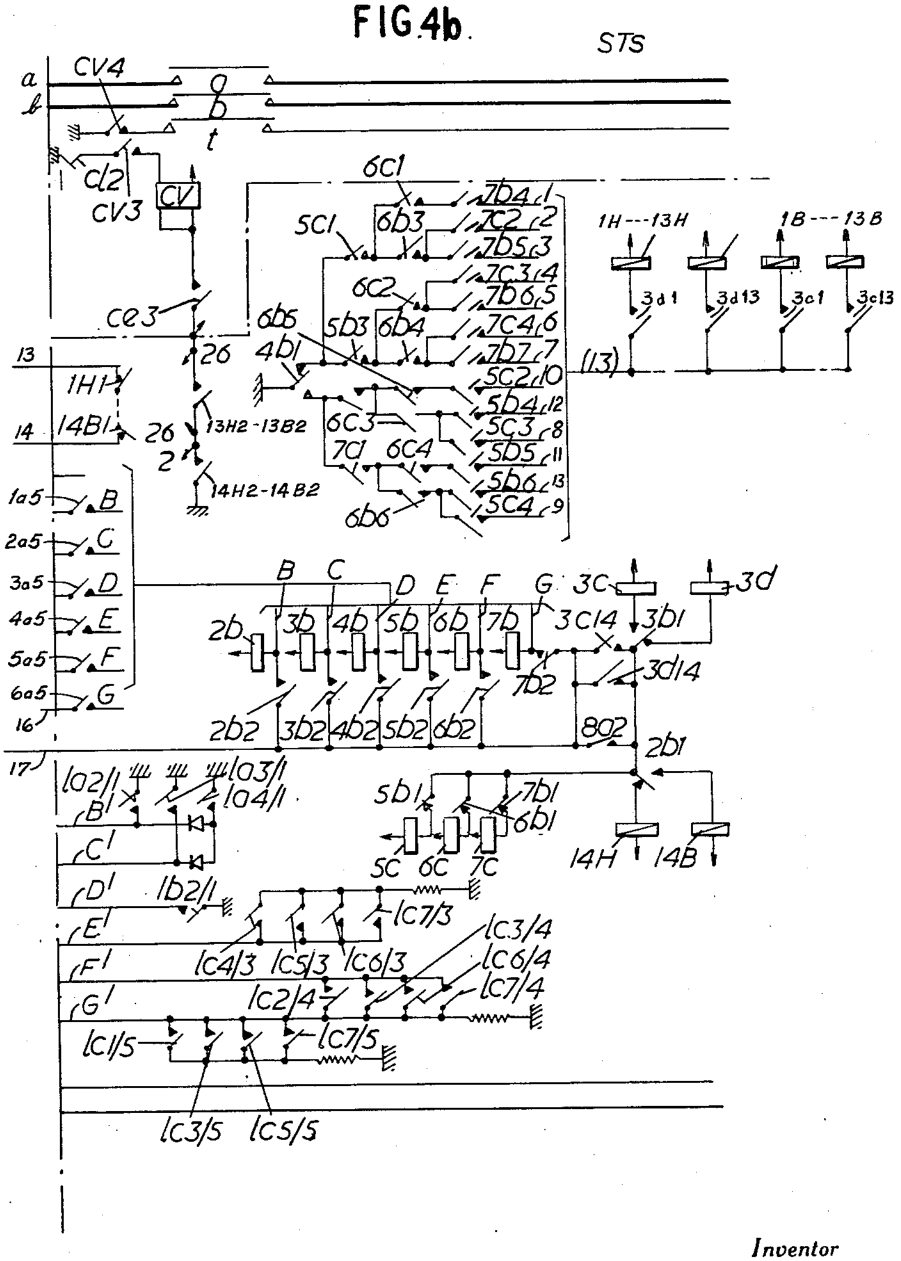
Figure 5:
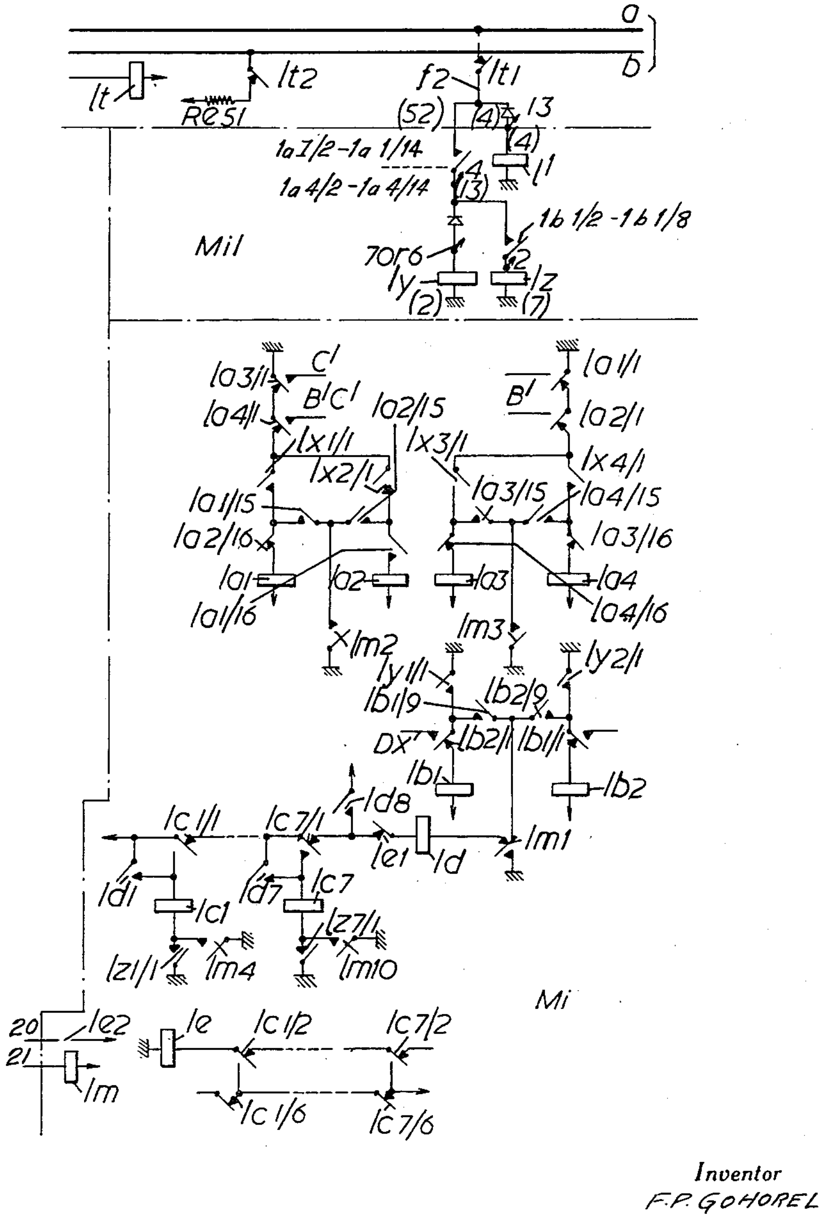
Figure 7:
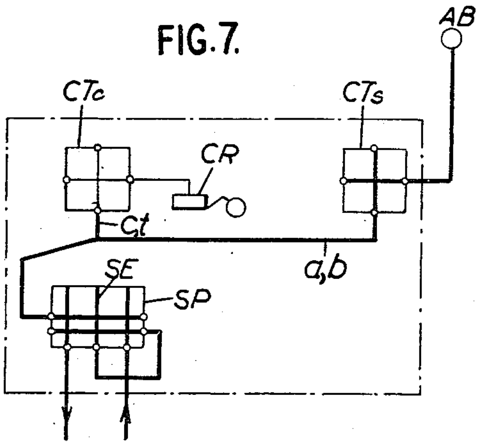
Figure 8:
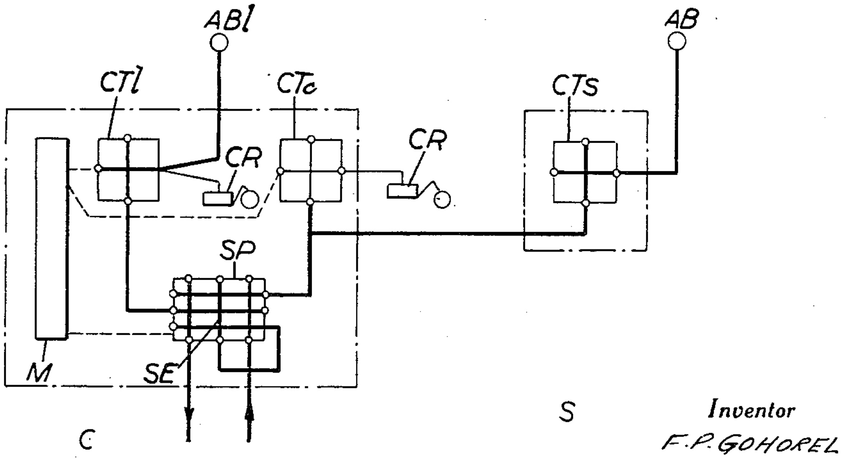
Figure 9:
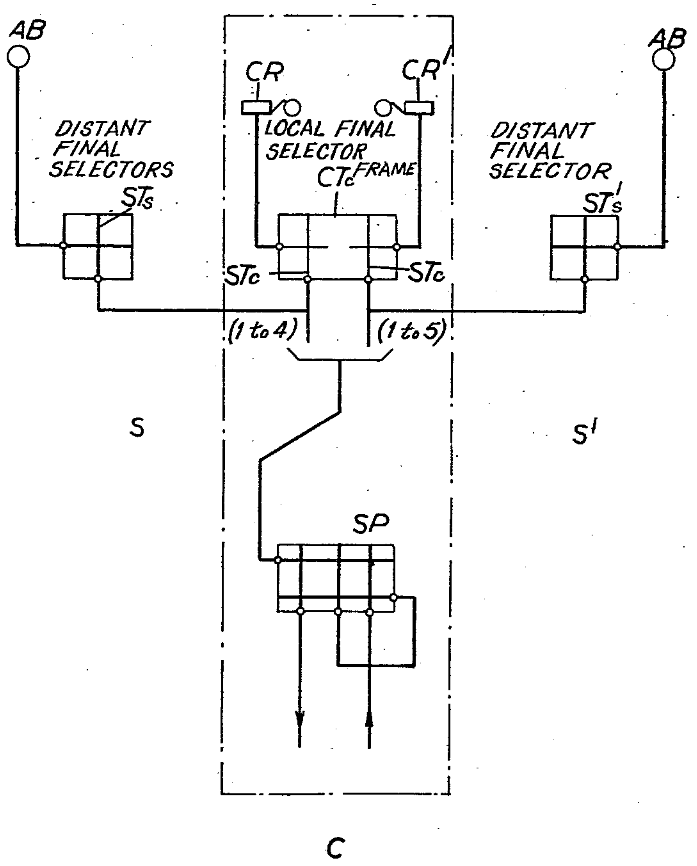
Figure 10A:
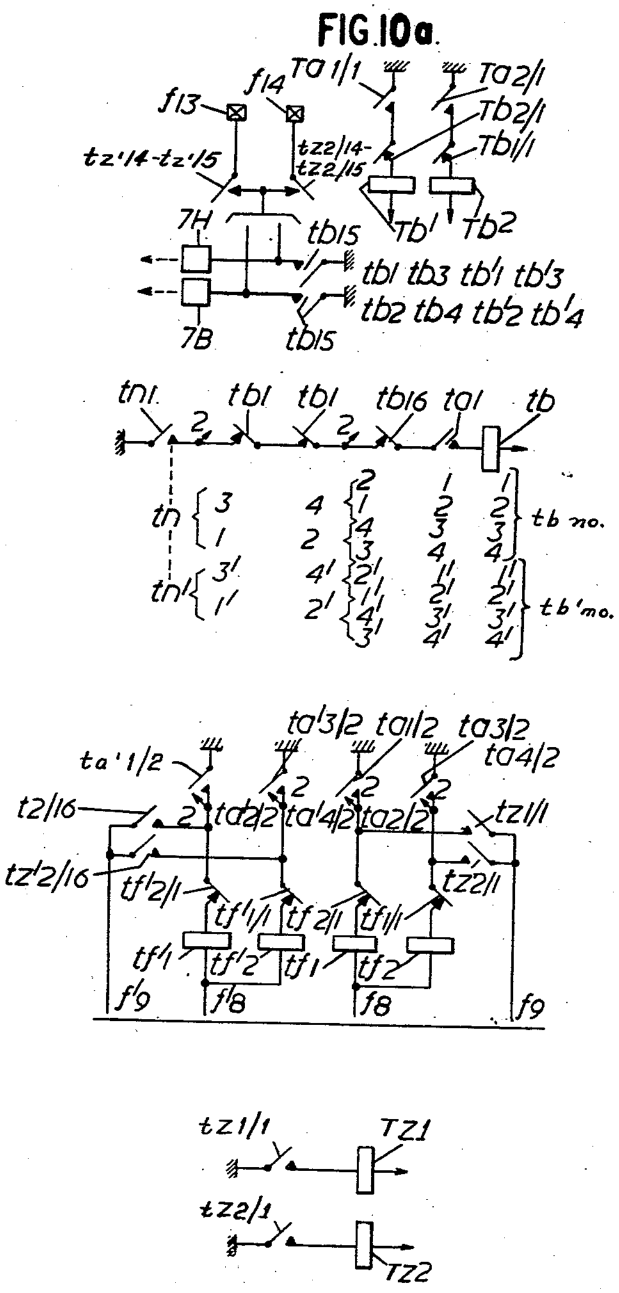
Figure 10B:
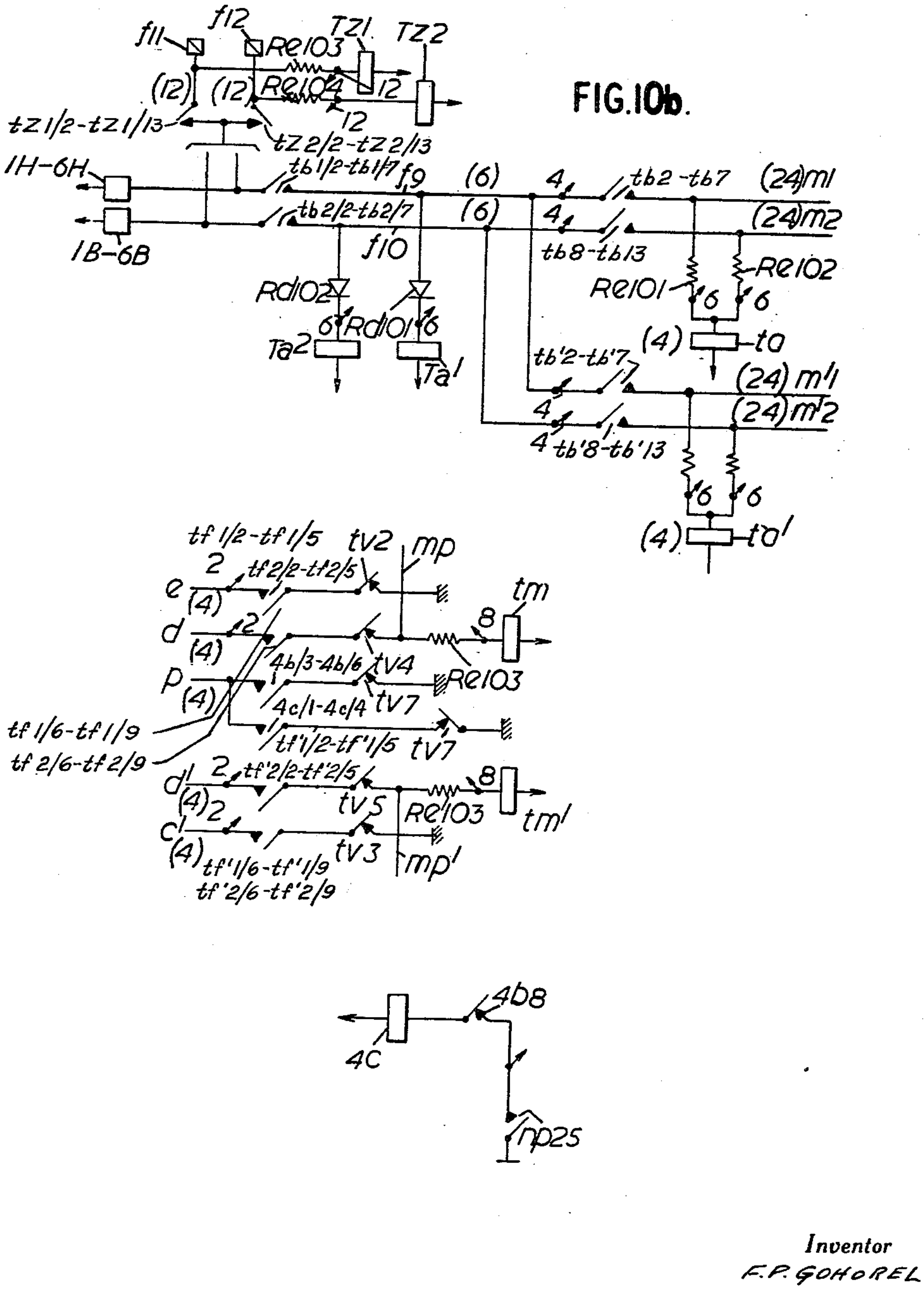
Figures 11, 12:
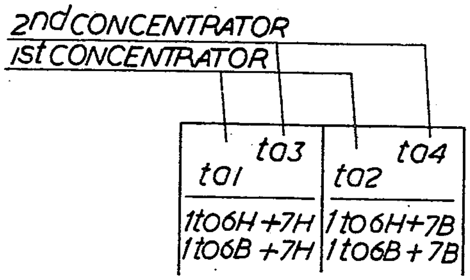
Figure 14:
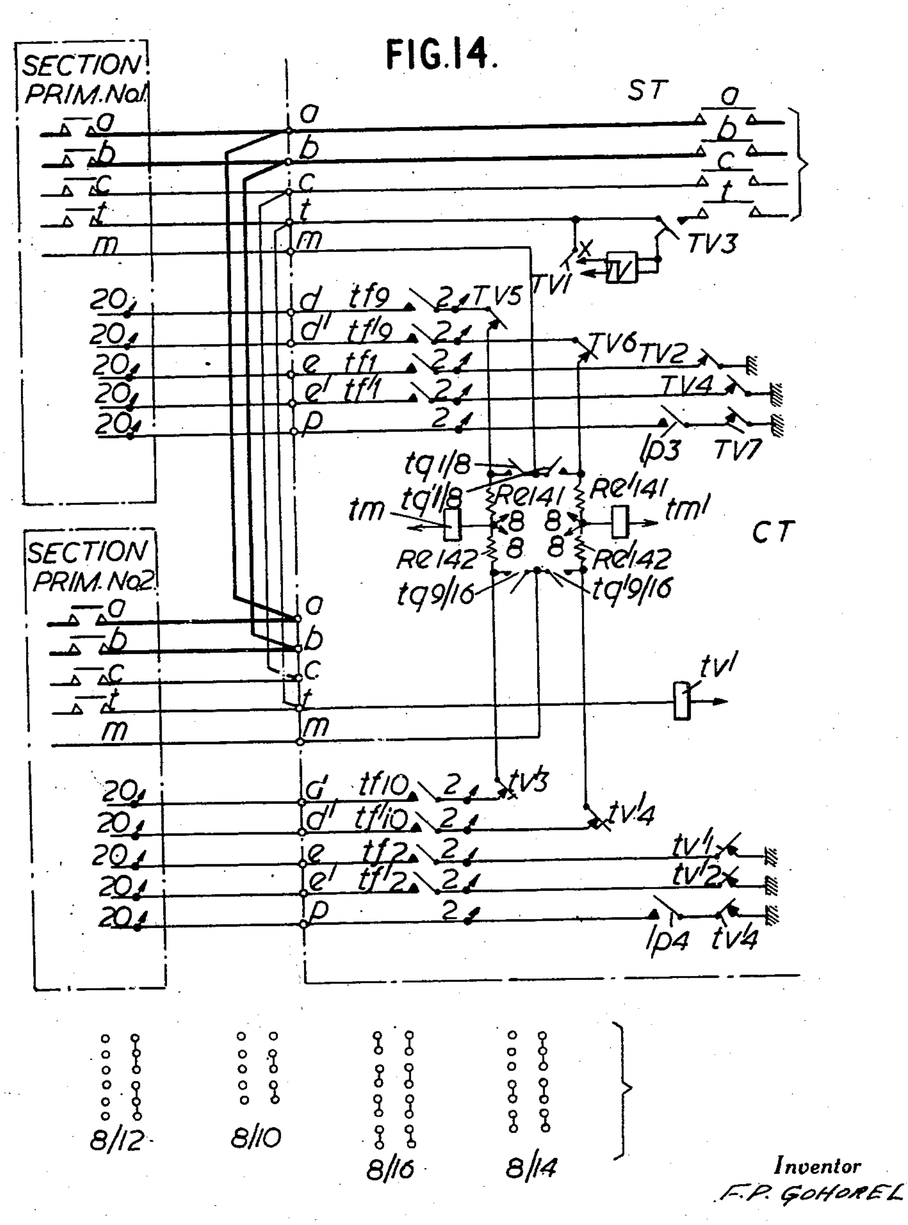
Figure 15:
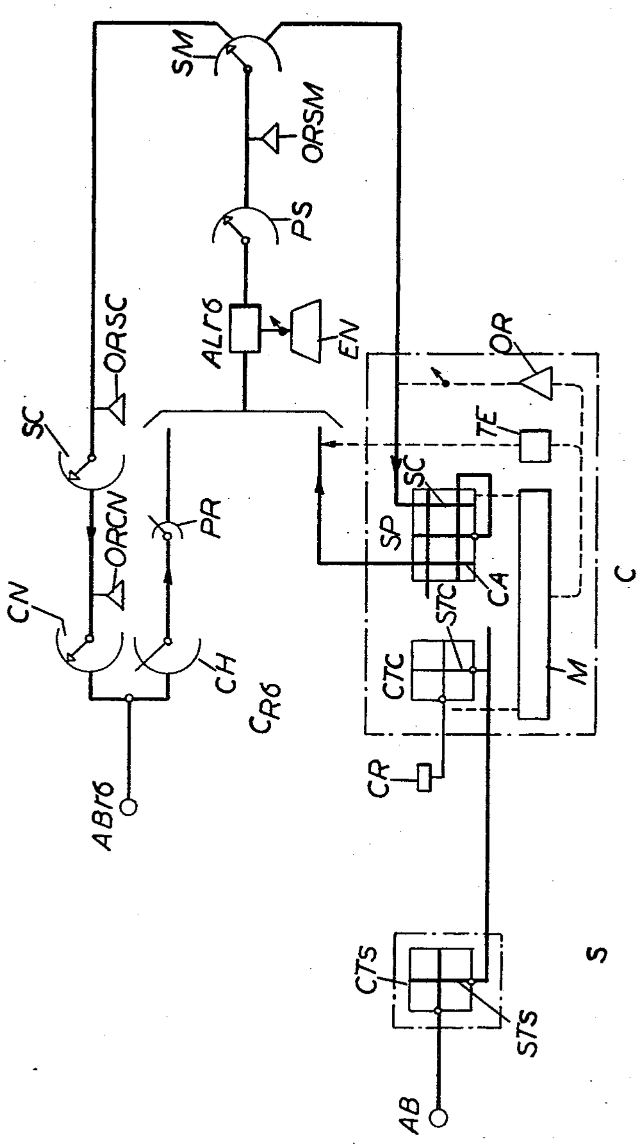
Figure 16:
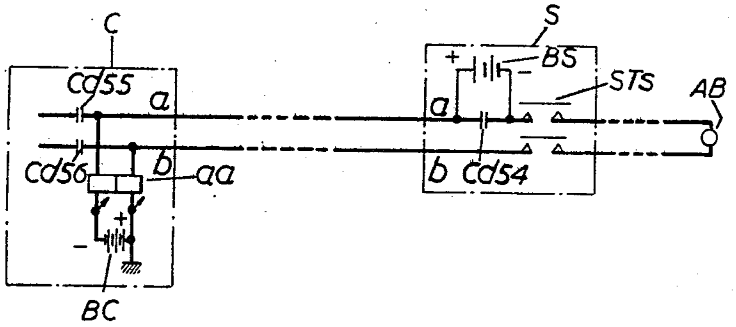
Figure 17:
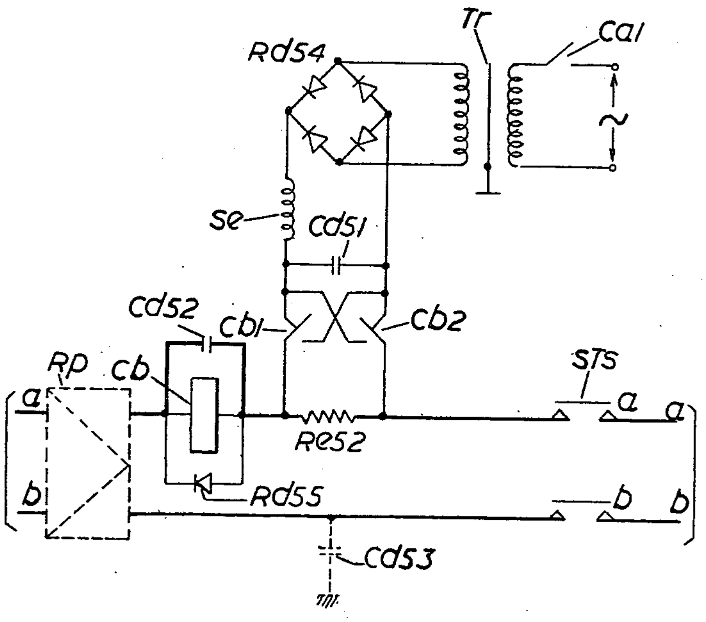
Figure 18:
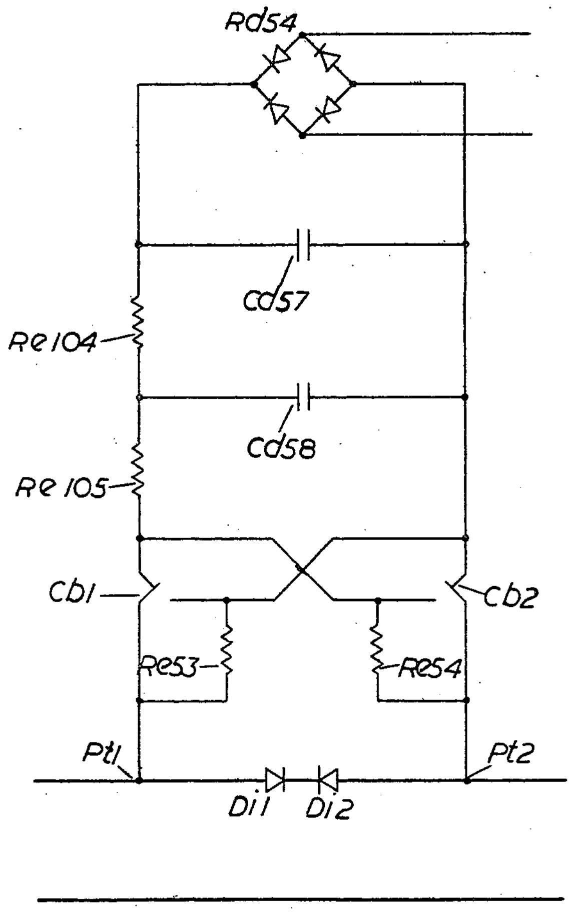
Figure 19:
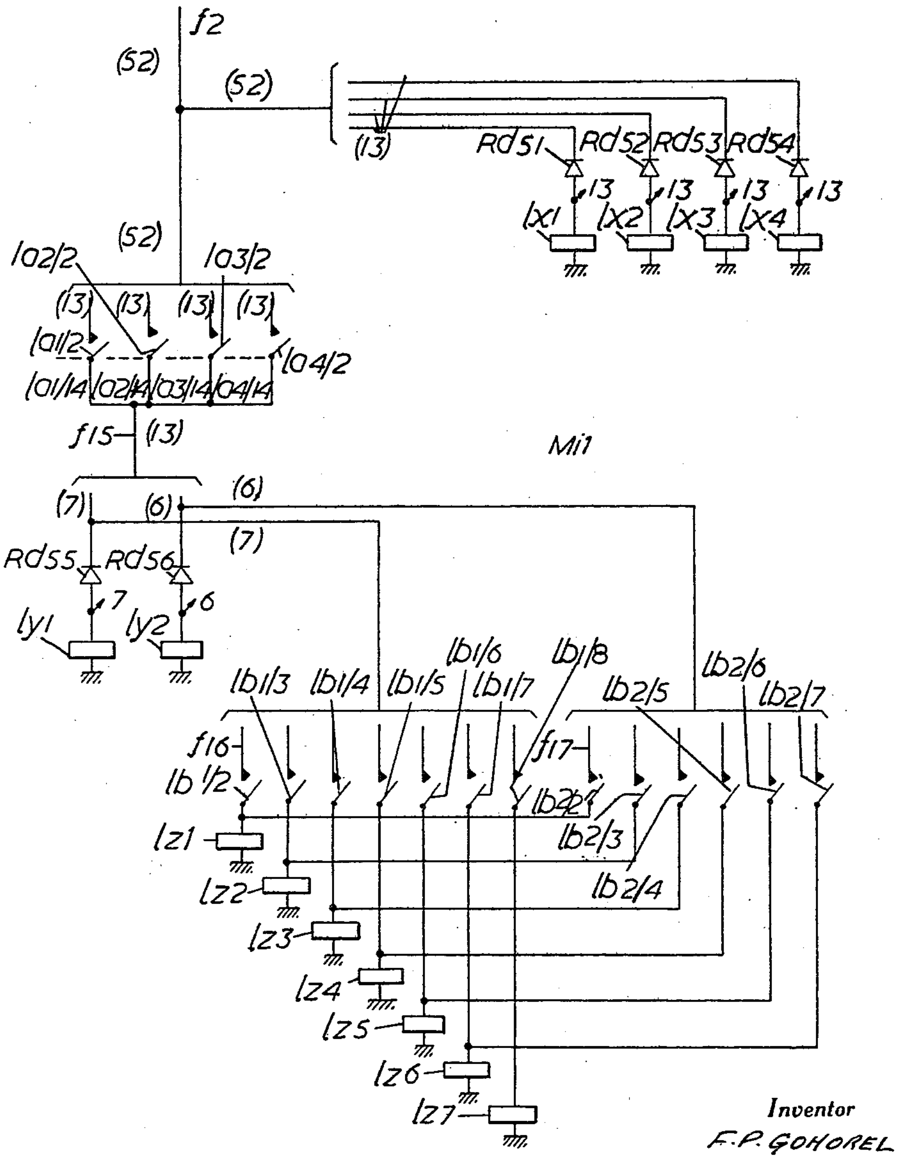
Figure 20:
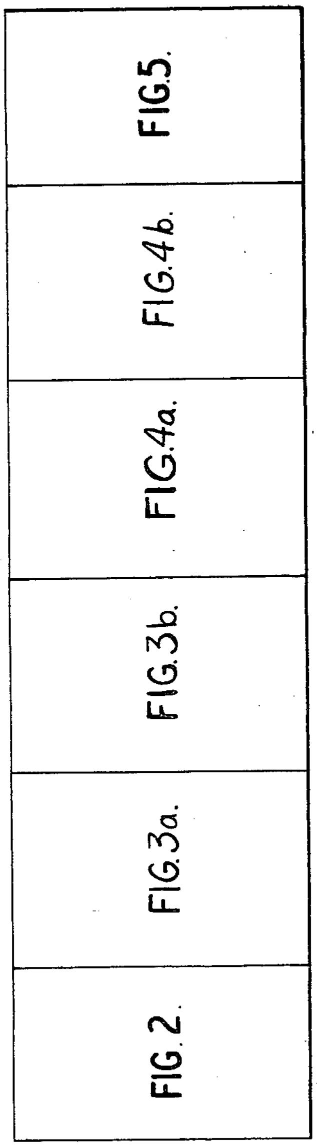

FIG. 3*a* and 3*b* placed alongside each other show the wiring of the circuit junctor assigned to the exchange and the corresponding send-receive device (in the following description, the term junctor will be applied to the apparatus arranged at the end of a circuit or a line and which serves to connect the circuit or line to the exchange equipment);

FIG. 4*a* and 4*b* placed alongside each other show the wiring of the circuit junctor assigned to the concentrator and the corresponding send-receive device;

FIG. 5 is the drawing of the subscriber's junctor and the calling line identifying matrix FIG. 6 is a table giving the necessary information to wire the contacts of the local part of the final selector;

FIG. 7 is a circuit diagram of a completely exploded line selection element, serving only the subscribers connected to distant concentrators;

FIG. 8 is a circuit diagram of a partially exploded line selection element serving on the one hand local subscribers and on the other hand the subscribers connected to distant concentrators;

FIG. 9 is a circuit diagram of a line selection element giving access to two different concentrators;

FIG. 10*a* and 10*b* show circuit additions and modifications to be carried out in a final stage giving access to two distant concentrators;

FIGS. 11, 12 and 13 are tables giving necessary information to wire up the circuits of FIG. 10;

FIG. 14 shows wiring for connecting a lightly loaded final selector frame to two different primary portions of the same line selection element;

FIG. 15 is a schematic diagram of an arrangement to utilize the concentrators, subject of the invention, in a step-by-step exchange;

FIG. 16 is a simplified drawing of the subscribers additional supply device, in case of very distant concentrators;

FIG. 17 is the wiring diagram of the device of FIG. 16;

FIG. 18 is an alternative diagram of FIG. 17, in which a regulating device is used in order to lower the cost of the supply rectifier;

FIG. 19 shows some circuit details of the line identifying matrix lying at the distant concentrator;

FIG. 20 shows the relation between FIGURES 2 to 5.

The general operation of a telephone system, according to the invention, will now be described, referring to FIGURE 1.

It will now be assumed in the following description that the switches used to set up a connection are of the crossbar type, or multiswitches of a known type comprising individual selectors. Selection of a given outgoing line is carried out by means of apparatus termed selection bars. Each of these bars is associated with two select magnets termed upper and lower select magnets, and each bar may assume either of two active positions depending upon which magnet is operated. In each of these two positions, said selection bar prepares the connection of an individual selector toward two outgoing lines. Selection of either of these lines is carried out by operating one or the other of the two magnets associated with an additional selection bar, following a known principle, these magnets being termed addition selection magnets. Let *a* be the number of selection bars, without taking into account the additional bar, there will be 2*a* select magnets and a selection can be carried out among two sets of lines having each 2*a* lines. The choice of either set is carried out by the magnets associated with the additional bar; the choice of the line in the set of lines is carried out by one of the 2*a* select magnets, mentioned in the foregoing.

Each selecting magnet is referenced by a number, indicating the row of the corresponding bar and a capital letter, H for upper and B for lower magnet.

Selecting magnets merely prepare the connection of an individual selector toward a line, said connection being then effectuated by a bar operated through a hold magnet or connecting magnet associated with each individual selector. The connection is held as long as this hold magnet is being operated, whatever be the position of the selecting magnet which prepared the connection. In the following description, the term "frame" will be assigned to the set of individual selectors belonging to the same multiswitch and the relays used to control said selectors.

In the different circuit diagrams, these multiswitches have been represented schematically by thick lines perpendicular to each other and included in thin line rectangles. Each vertical line represents an individual selector having access to a certain number of outgoing lines, each outgoing line being represented by a horizontal line.

Figure 1:
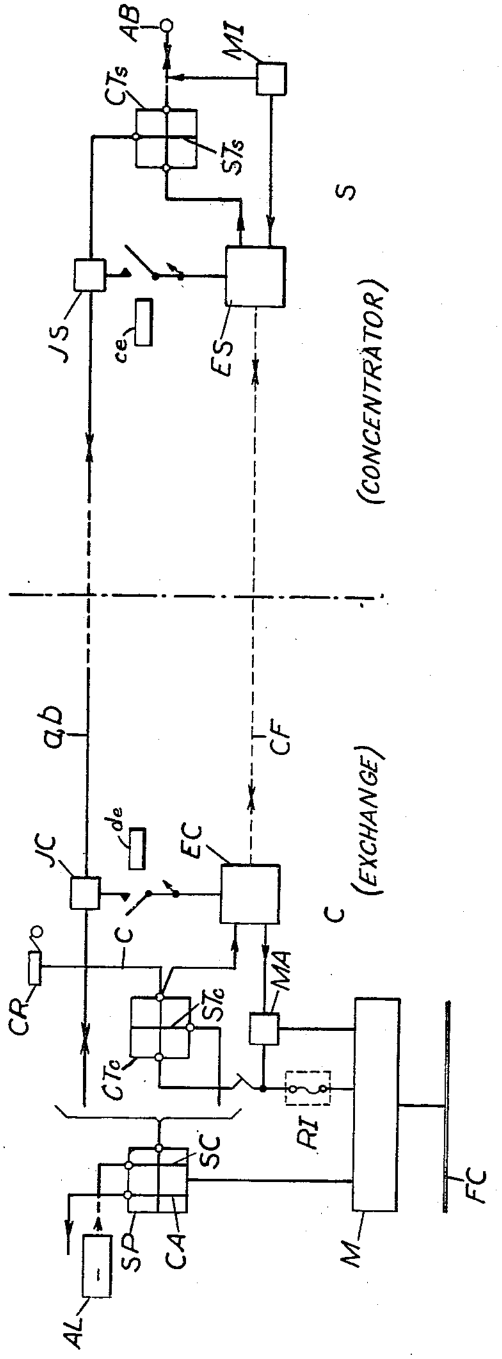
FIG. 1 is a trunking diagram pertaining to the general operation of the system.

In circuit diagram of FIGURE 1, there has been shown on one hand an exchange C and on the other hand a concentrator S connected to said exchange through a two-wire circuit *a*, *b*, and giving access to a certain number of subscribers AB. In order to choose a subscriber AB of concentrator S, two selection stages are provided. The primary stage SP, lying at exchange C, comprises on one hand calling line finders CA to carry over the traffic coming from the concentrator subscribers, and on the other hand fifty selectors SC to extend the traffic towards subscribers of said concentrators. The final stage comprises two distinct parts, CT*c* lying at exchange C and CT*s* lying at concentrator S. The local part of the final stage, i.e. the part CT*c* lying at exchange C, comprises a certain number of selectors ST*c* which provide marking, testing, transmission of subscriber's category and connection towards the meter CR.

The distant part of the final stage, i.e. part CT*s* lying at the concentrator, comprises a certain number of selectors ST*s* which allow the connection of the line wires. Arrangements are provided for setting selectors ST*c* and ST*s* on the same level. Thus, the different functions accomplished usually by the final selector of the exchange are here allotted to two different final selectors, the one ST*c* lying at the exchange and the other ST*s* lying at the concentrator. The exchange selector ST*c* has been represented by thin lines, to point out that it does not ensure the continuity of the talking conductors.

At the exchange C, primary stage SP and final stage CT*s* are controlled by one or several markers M. The marker may receive information particular to a calling subscriber and coming from marking relays MA, or information particular to a called subscriber and coming from the register (not represented) through connecting bundle FC. The first function of the marker lies in "marking" the subscriber (calling or called) on the outlets of final selector ST*c*; in the case of a called subscriber, this marking is accomplished through a distributor RI, to ensure complete independence between the subscriber's number and his position on the final selector's outlets. The second function of the marker lies in the determination of the final selector frame which must carry out the call; hunting of a final selector and of the subscriber are performed by apparatus located in the frames.

A junctor JC is provided at the outlet of each circuit *a*, *b*, connecting the exchange C to the concentrator S; it is designed to send and receive the different signals necessary to extend the call. A send-receive device EC, common to all or a number of exchange junctors JC can be temporarily connected to one of these junctors through contacts of a relay *de*. In case of a call coming from a subscriber AB of the concentrator, this send-receive device receives through junctor JC and contacts of relay *de* information characterizing the position of said subscriber on the final selectors outlets, said information being then registered on the marking relays MA. In case of a call to a subscriber AB of the concentrator, the send receive device receives the position information from final selector ST*c* in order to retransmit it towards the concentrator through junctor JC.

At concentrator S, a junctor has been provided for each circuit *a*, *b*, the function of which is to send and receive the different signals necessary to extend a call. A send-receive device ES common to all or part of concentrator junctors JS can be temporarily connected to one of them through contacts of a relay *ce*. In case of a call originated from the subscriber AB of the concentrator, it receives the position information of the calling subscriber from the identification matrix MI, in order to retransmit it to the exchange through junctor JS and circuit *a*, *b*. In case of a call for a subscriber of the concentrator, it receives from the exchange the position information of the called subscriber in order to control the setting of selector ST*s* on the corresponding level.

The process of extending a call towards a subscriber AB of the concentrator will now be described. This call is received by the fifty selectors SC, the corresponding frame connecting itself with an idle marker M. This latter receives from the register, through connecting bundle FC, the portion of the subscriber's number necessary for the setting of the primary selection stage and the final stage. Through distributor RI, the marker marks the called subscriber on the outlets of final selectors ST*c*. The primary selection stage and the final stage are then set on a position characterizing the caller subscriber, after which marker M is cleared.

Junctor JC is seized by fifty selector SC and connects itself to an idle send-receive device EC through contacts of relay *de*. Generally a single send-receive device is sufficient to carry over the traffic between the exchange and the concentrator, and it may happen that said send-receive device is busied by another call when junctor JC attempts to connect itself with it. In this case, junctor JC waits till send-receive device is cleared; the busy time of said one being very short, the delay in extending the call is negligible. Send-receive device EC receives from final selector ST*c* an information characterizing the position of the called subscriber on the outlets of said selector. Junctor JC sends towards the distant junctor JS a seizure signal, whereby said junctor JS connects itself with an idle send-receive device ES through contacts of relay *ce*. A go ahead signal is then transmitted from junctor JS to send-receive device EC through junctor JC. Send-receive device EC sends then to the distant send-receive device ES, a code characterizing the position of the called subscriber on final selectors outlets. This code is sent through contacts of relay *de*, junctor JC, circuit *a*, *b*, junctor JS and contacts of relay *ce*. The code is an *n* element binary code, with which $2^n$ combinations can be obtained, although using a very short transmission period. Send-receive device EC, the function of which is now completed, is cleared up. At concentrator S, send-receive device ES controls the setting of final selector $ST_s$ on a position corresponding to the received code, then is cleared up in its turn. Both portions of final selector, i.e. the local part $ST_c$ lying at the exchange the distant part $ST_s$ lying at the concentrator assume identical positions.

Ringing current is sent to the called subscriber AB from a supply device device AL located at the exchange, through the following circuit: fifty selector SC, junctor JC, circuit *a, b,* junctor JS, final selector $ST_s$ and subscriber AB.

When the called subscriber answers the call, the supplying device accomplishes the usual functions; the two subscribers are now connected through the circuit mentioned for the ringing current.

The foregoing arrangements have been provided in order to reduce to the utmost the equipment of the distant part $ST_s$ of final selector; as a matter of fact, the function of this latter is limited to the establishment of the connection between circuit *a, b,* and the called subscriber AB; sending of ringing current, detecting subscriber's answer, metering and holding the connection are performed by the supply device located at the exchange.

At the end of the call, supply device AL controls the clearing up of the different apparatuses seized in the following manner. It causes first clearing of fifty selector SC, but junctor JC is temporarily held and ensures the holding of final selector $ST_c$. It then sends toward distant junctor JS a signal controlling the clearing of the different apparatuses seized at the concentrator S. When this clearing is completed, junctor JS sends an "all clear" signal to junctor JC which is cleared in its turn, as well as final selector $ST_c$.

The process of extending a call originated by a subscriber AB of the concentrator will now be explained. When said subscriber lifts his handset, identification matrix MI receives information characterizing the position of this subscriber on the final selectors outlets, said information being then received and registered at the send-receive device ES, if this latter is idle. In case that the send-receive device is busy, the subscriber's call remains in the waiting condition, but this delay is negligible as already explained. The send-receive device ES puts the calling condition on all idle junctors JS of concentrators S; these junctors then attempt to connect themselves with the send receive device ES, but only one will succeed and will transmit the identification code toward the exchange.

Junctor JS sends then a seizure signal towards junctor JC which connects itself with the send-receive device EC and sends back to junctor JS a go ahead signal. The indentification code characterizing the position of the calling subscriber on the final selectors outlets is then transmitted to the send-receive device EC through following circuit: send-receive device ES, contacts of relay *ce,* junctor JS, circuit *a, b,* junctor JC, contacts of relay *de,* and send-receive device EC. From the foregoing explanations, it appears that the functions of send-receive devices EC and ES are inverted; in case of a call toward a subscriber of the concentrator, it is EC which sends and ES which receives; in case of a call originated from a subscriber of the concentrator, it is ES which sends and EC which receives. As in previously described case, the identification code is an $n$ element binary code. After send-receive device ES has transmitted the received code towards the exchange, it is cleared out. Send-receive device EC transmits the received code to the marking relays MA, after which it is cleared in its turn. In the case under consideration, both junctors JS and JC are held only by the corresponding send-receive devices and are cleared at the same time as these devices.

Marking relays MA cause the seizure of marker M and mark on the outlets of final selectors $ST_c$ the position corresponding to the calling subscriber. Following the same process, a call finder CA is picked out and connected to the marked position through an idle final selector $ST_c$, after which, marker M and marking relays MA are cleared.

A junctor JC is then seized by a call finder CA. It will be noted that this junctor is not necessarily the same as the one used to transmit the identification code. The different seized apparatuses are thus in the same condition as in the case of a call for a subscriber of the concentrator. Thus, the following operations take place in the same manner: the send-receive device EC receives from final selector $ST_c$ the identification code, which is then transmitted to the send-receive device ES which controls the setting of final selector $ST_s$ on the calling subscriber AB.

It follows from the preceding explanations that circuit *a, b,* has been used twice, once for transmitting the identification code to the exchange and for the setting of the selection stages lying at said exchange, and another time for retransmitting the identification code in the opposite direction and for the setting of the final selector portion lying at the concentrator. This arrangement enables a similar operation whatever be the direction of the call, from the instant when the selection stages lying at the exchange are positioned, permitting thus a great simplification of the equipments and an appreciable saving of material.

The calling subscriber is then connected to the exchange register (not represented) through the following circuit: subscriber AB, final selector $ST_s$, junctor JS, circuit *a, b,* junctor JC, call finder CA. It then receives the dial tone and dials the wanted number. This number is received by the register and the call is extended through exchange C, according to a process, which will not be described herein, since it is not part of the invention. When the call subscriber answers, one or several metering pulses are sent to the meter CR associated with the calling subscriber through the following circuit: call finder CA, final selector $ST_c$, wire *c* and meter CR. Clearing is effected according to a process already described.

In case of a call between subscribers of the concentrator no special difficulty is encountered, if two junction circuits at least have been provided between the exchange and the concentrator. One of them is employed to handle the call from the calling subscriber towards the exchange and the other one extends the call in the opposite direction.

It may happen that two calls occur at the same time, one originated by the exchange and the other one by the concentrator. If both junctors JC and JS attempt to send at the same time their seizure signal, these signals will not be effective since no receiving equipment is in use. Two delay devices are set into operation, one at the exchange and the other one at the concentrator. These two devices are not identical and one of them operates before the other and causes the clearing of all equipments located at the corresponding end. The call originated by the other end can thus be extended.

It may also happen that the calling subscriber hangs up his handset without completing his call. In this case his identification code, stored on the marking relays MA, causes the setting of the two selection stages of the exchange on the position corresponding to this subscriber, as already stated. Junctor JC is seized by the call finder CA, but since the calling subscriber has hung up, the exchange register (not represented) does not find the loop through wires *a, b,* and consequently causes clearing out.

In case the called subscriber is busy, a contact *nt*1 (FIG. 3a, left) located at the exchange C and individual to said subscriber is opened; consequently there is no marking on the outlets of final selectors $ST_c$. A delay device is then put into operation at the marker after a certain time has elapsed, said marker sending then to the register through connecting bundle FC a signal characterizing the busy condition. The register conducts then the call in a convenient manner. Thus, the distant part of the final selector, i.e. the part located at the concentrator, plays only a passive part since it ensures only the continuity of the talking wires; the local part, on the contrary, i.e. the part of the final selector lying at the exchange plays an active part; it is positioned first on the level corresponding to the subscriber (called or calling); it assigns its position to the other part; finally it performs the different control functions such as the testing of the subscriber and the metering. Thus, the distant part of the final selector is much simplified.

In case the subscriber connected to the concentrator delays hanging up of his handset whether he is calling or called, the supply device AL causes nevertheless the clearing of the different apparatuses seized, except the junctor JC and final selector ST*c*. The junctor JC sends a busy signal to the subscriber, to inform him that he is in permanent loop. When this latter hangs up his handset, junctor JC and selector ST*c* are cleared out.

Referring now to FIGURES 2 to 5, assembled as indicated in FIGURE 20, an embodiment of the invention will be described in detail.

On the diagrams, the relays have been represented by rectangles, the select magnets of the multiswitch by crossed rectangles and the hold magnets by squares. Generally, the different relays are designated by groups of two letters, the first one being common to all relays of the same equipment and the second one identifying said relay among the relays of said equipment. Capital letters have been assigned to designate the select and hold magnets.

To designate relays performing similar functions, the same group of letters has been used, followed by one of the FIGURES 1 to 9. On the other hand, the contacts associated with the relays or the magnets have been designated by the same reference as the corresponding relay or magnet, followed by one of the FIGURES 1 to 9. Thus, for instance reference *de*3 relates to the third contact of relay *dc*; reference *lc*7/1 relates to the first contact of relay *lc*7, said relay *lc*7 belonging to a set of relays *lc*1, *lc*2 . . . *lc*7 performing similar functions.

To simplify the drawings, all similar members of a set within the apparatus or circuits have not been represented, but only one or two of each set are shown, the number of like members in each set being indicated between brackets. Bundles of wires or cables have been represented most of the time by a single wire; the same reference designation relates to a given wire at the inlet and the outlet of the cable.

The detailed descriptions deal principally with the final selector ST*c*, the junctor JC, the send-receive device EC, the marking relays MA and all the equipments located at the concentrator.

It will be assumed at the beginning of this detailed description that all equipments are represented at rest. All the relays and magnets of said equipments are also at rest except those mentioned in the following sections.

It will be assumed, for simplicity, that the multiswitches used in the embodiment chosen to illustrate the invention comprise 13 select bars and their 26 associated select magnets, combining with the additional select bar and its 2 select magnets to enable the multiswitch to perform a selection among 2 sets of 26 lines, i.e. among 52 lines. Each multiswitch comprises 20 individual selectors. Thus, 52 positions are available on the final selectors outlets, at the exchange as well as the concentrator, which allows the gathering of 52 subscribers in said concentrator.

The case of a call from a subscriber at the exchange to a subscriber of the concentrator will be taken up first.

The portion of the called subscriber's number which is necessary for the setting of the fifty SC and the final selector ST*c* is received by the marker (M in FIG. 1). A wire *f*1 (FIG. 3*a*, left) is grounded by said marker, the ground being extended to final selectors frame ST*c* (FIG. 2), specifically to a wire *m* in this frame, through the marking distributor RI and a contact *nt*1 corresponding to the called subscriber. In the manner disclosed in the French Patent No. 1,103,699, the fifty selector and the final selector are positioned on the called subscriber; however, the operation of the hold magnet TV (FIG. 2) and thus the connection of the final selector on the position corresponding to the subscriber, are delayed until junctor JC, connecting to the circuit ending at the distant concentrator, is seized.

In the foregoing description, the first marker has been assumed to be operated; in case the second marker is used, the marking circuit is completed through wire *f'*1 and contact *nt*2.

When the connection is extended through the fifty selector (SC in FIG. 1) this selector grounds wire *t* (FIG. 2) and relay *dt* (FIG. 3*a*) is operated. Through its front or make contact *dt*1, relay *dt* causes the operation of hold relay TV (FIG. 2) of the final selector ST*c*; through its make contact *dt*2 (FIG. 3*b*, upper left corner), the following circuit is completed: ground, make contact *dt*2, break contacts *dc*2, *eg'*1, *em'*6, relay *ef'* which is operated, resistance Re30, battery; by *dt*3 (FIG. 3*a*, upper right), the following circuit is completed: battery, left-hand winding of relay *df*, break contact *dc*6, make contact *dt*3, break contacts *ep'*2, 1*a'*4, 2*a'*4, 3*a'*4, 4*a'*4, 5*a'*4, 6*a'*4, 7*a'*4, 8*a'*3, lead 10 (FIGS. 3*a* and 3*b*), *em'*5, ground.

In the final selector ST*c* (FIG. 2) magnet TV causes connection of said selector on the level corresponding to the called subscriber, this connection having already been prepared by select magnets (not shown). Make contact *tv*1 is closed and break contact *tv*6 is opened shortly after, the following circuit for hold magnet TV being completed: battery, series windings of TV, make contacts *tv*1, lead 11 (FIGS. 2, 3*a*), and *dt*1, ground; through *tv*3, and via contact *t* of the final selector and lead 12 (FIGS. 2, 3*a*), relay *nt* is energized, said relay corresponding to the called subscriber.

In junctor JC (FIG. 3*a*), relay *df* prepares, through its make contact *df*1, a hold circuit for itself as well as an energizing circuit for relays *de* and *ep'*.

In send-receive device EC, the following circuit is completed through make contact *ef'*1 of relay *ef'*: ground, make contact *ef'*1, relay *ep'* which is operated, make contact *df*1, relay *de* which is operated, right hand winding of relay *df* which is locked, battery; through make contact *ef'*2 operation of the two pulsating relays *ej'* and *ek'* (FIG. 3*b*, left) is prepared in contemplation of sending the identification code toward the concentrator; through *ef'*3 a hold circuit is completed for relay *ef'* and through *ef'*4, *ef'*6, *ef'*7 (FIG. 3*b*, middle) sending of signals toward the concentrator is prepared.

Relay *de* prepares through its make contacts *de*1 and *de*2 the sending of information toward the concentrator; through its make contacts *de*5 . . . *de*8 (FIG. 3*a*, upper), it prepares the sending of the identification code.

Relay *nt* breaks at *nt*1 the wire used by the marker to mark the position of the called subscriber on the final selector outlets; this break causes the clearing of the control relays (not shown) located in final selectors frame.

Relay *ep'* opens through its break contact *ep'*2 (FIG. 3*a*, right) the energizing circuit of relay *df*, but this latter holds itself in series with relay *de*, as described. It will be noted that the different break contacts *df*1 associated with relays *df* of all junctors JC form a chain, so that if several junctors JC served by the send-receive device EC attempt to connect themselves to said send-receive device, only one will succeed, since only one relay *de* can hold itself; the other relays *de* have their hold circuit opened by break contacts *df*1 located upward in the chain. At *ep'*4 (FIG. 3*b*, upper center), the following circuit is completed by relay *ep'*: battery, upper winding of relay *ej'*, break contact *ek'*1, make contact *ep'*4, break contact 8*a'*1, make contact *ef'*2, ground.

Relay *ej'*, whose lower winding is looped on resistance Re31, is delayed and operates after a delay. Through its make contacts *ej'*1, and *ej'*2, it supplies current to the two line wires *a* and *b* of junction circuit toward the concentrator through the following circuit: battery, resistance Re32, make contacts *ef'1*, *ef'6*, *de1*, make contact *de10*, break contact *dc1*, wire *a*, wire *b*, break contacts *dc7*, *dl2*, make contacts *de2*, *ef'7*, rectifier Rd31, relay *ea'*, break contact *eb'1*, break contacts *8a'5*, make contacts *ef'4*, and *ej'2*, ground. The supply of the two line wires corresponds to the sending of the seizure signal toward the distant concentrator. Through its make contact *ej'3*, relay *ej'* prepares the energizing circuit of the second pulsating relay *ek'*.

At the distant concentrator S (FIGS. 4*a* and 4*b*) the seizure signal, which corresponds as already stated to a battery on *a* wire and a ground on *b* wire, is received by relay *cp* (FIG. 4*a*, top) through the following circuit: batery on *a* wire, break contacts *cv1*, *cl4*, and *ce1*, relay *cp* which is operated, break contacts *ce2* and *cv2*, *b* wire. Through its make contact *cp1*, relay *cp* prepares the energizing circuit of relay *cf* in order to connect junctor JS to send-receive device ES; through *cp2* it energizes relay *eg* (FIG. 4*a*, left).

Relay *eg* prepares at *eg2* (FIG. 4*a*, middle) the energizing circuits of relays *ep*, *ce*, *cf* in order to connect junctor JS to send-receive device ES; through *eg3*, the following circuit is completed: battery, resistance Re41, break contacts *cv6* and *cl3*, right hand side winding of relay *cf*, make contacts *cp1* and *eg3*, break contacts *ep1*, lead 13 (FIG. 4*a*–*b*), 1H1 . . . 14B1, lead 14 (FIGS. 4*b*–*a*), *1a4*, *2a4*, *3a4*, *4a4*, *5a4*, *6a4*, *7a4*, *8a3*, *em2*, ground; at *eg4*, relay *eg* short-circuits its right hand side winding which delays its restoring time.

Through its make contact *cf1*, relay *cf* completes for itself the following hold circuit, as well as energizing circuit for relays *ce* and *ep*: battery, resistance Re41, break contacts *cv6* and *cl3*, left hand side winding of relay *cf*, relay *ce*, make contacts *cf1*, contact of distributor Di at position 1, relay *ep*, make contact *eg2*, ground.

By opening of its two break contacts *ce1* and *ce2* (FIG. 4*a*, top), relay *ce* restores relay *cp*; by its make contacts *ce1*, *ce2*, *ce3* (FIG. 4*b*, upper left), connection of junctor JS with send-receive device ES is accomplished. The following circuit is thus completed through relay *ea* (FIG. 4*a*, middle): battery on *a* wire, break contacts *cv1* and *cl4*, make contact *ce1*, break contact *ef8*, rectifier Rd42, relay *ea*, break contacts *eb1*, *8a4*, *ef3*, and *ef2*, make contact *ce2*, break contact *cv2* and *b* wire.

At the exchange, relay *ea'* (FIG. 3*b*, middle) has not been able to operate in series with receiving relay *cp* because of the great resistance of this latter, but it operates now in series with relay *ea* of the concentrator. This lowering of loop resistance of line wires *a* and *b* corresponds to the sending of dial-tone from the concentrator S toward the exchange C.

At concentrator S, relay *ep* breaks at *ep1* the circuit of relay *cf* (FIG. 4*a*, top), but this latter holds itself by its left hand side winding in series with relays *ce* and *ep*, as described. However, it will be noted that the break contacts *cf1* of relay *cf* corresponding to the different junctors JS served by the send-receive device ES, form a chain, so that if two junctors JS attempt to connect themselves at the same time to said send-receive device ES, only one of them will succeed; the relays *cf* of the other junctors cannot hold themselves, their circuit being opened by break contacts *cf1* located upward in the chain.

When relay *cp* restores, it breaks at *cp2* the energizing circuit of relay *eg*, but the restoration of this latter being delayed by its short circuited right hand winding, remains operated.

The following circuit is completed by make contact *ea2* of relay *ea*: ground, make contacts *ea2*, break contacts *7a2*, *6a2*, *5a2*, *4a2*, *3a2*, *2a2*, relay *1a* which is operated; battery.

As already stated, the concentrator serves 52 subscribers. Using a 6 element binary code, $2^6=64$ combinations are possible, 52 of which are only used. More precisely, the identification code is as follows. 6 successive breaks of the line supply current are made and during each of them a code element is sent. Two code elements are used: the "0" element characterized by the absence of current and the "1" element characterized by a current whose direction is reversed with respect to the current used for the seizure signal (normal supply current). In other words, the "0" code element is characterized by the absence of current and the "1" code element by a reversed current. It is understood that the transmission of 2 code elements is always separated by a period of normal supply current. If this normal current is represented by a dash, following codes can be obtained:

0–0–0–0–0–0–
1–0–0–0–0–0–
0–1–0–0–0–0–
1–1–0–0–0–0–
etc.
. . . . . . . . . . . .

To compute these code elements, a counting chain is used at the exchange as well as at the concentrator. At the exchange, this chain is composed of 8 relays *1a'* . . . *8a'* (FIG. 3*b*); relay *1a'* is operated at the moment the dial-tone is received, i.e. just before the identification code is transmitted; the six relays *2a'* . . . *7a'* are operated respectively at the beginning of the line current breaks, whatever the code element transmitted during said breaks (0 or 1); relay *8a'* is operated at the beginning of the seventh break which indicates the end of the identification code transmission.

To characterize a given subscriber, some wires H', B', C', D', E', F', G', I' (FIG. 3*a*, lower right) are grounded. The maximum number of these wires liable to be grounded is 4. For this purpose, 4 contacts *de5* . . . *de8* are used which respectively connect via four wires 14 (FIGS. 3*a*–2) to 4 contacts *m* of final selector STc. FIGURE 6 shows a table of connections of wires H', B' . . . I' to the 4 outlet contacts *m* for each subscriber. In the left column, references of the 26 final selector STc select magnets are given, 1H, 1B, 2H, 2B . . . 13H, 13B. References 14H and 14B are relative to the two additional magnets associated with the additional bar. In order to set the final selector STc on a given position among the 52 possible positions, one of the 26 select magnets 1H . . . 13B is operated as well as one of the two additional magnets 14H and 14B. The 4 columns at the right hand side indicate which of the wires B' . . . H' have to be connected and on what *m* contact. Thus, for instance, in case of the subscriber corresponding to magnets 1H and 14H, wire G' is to be connected to contact *m4*; in case of the subscriber corresponding to magnets 13B and 14B, wires B', H' and I' are to be connected respectively to contacts *m1*, *m2* and *m3*. While the counting chain progresses, relay *el'* (FIG. 3*a*, lower right) is successively connected to wires B' . . . H', allowing thus by means of its two make contacts *el'1* and *el'2* (FIG. 3*b*, middle), the successive transmission of the different code elements.

At the concentrator, an identical counting chain is provided, comprising relays *1a* . . . *8a* (FIG. 4*a*). Relay *1a* is operated when dial tone is sent, i.e. just before reception of the identification code; the 6 following relays *2a* . . . *7a* are operated at the beginning of each line current break used for the transmission of a code element; relay *8a* is operated at the beginning of the seventh line current break which corresponds to the signal of code ending; relay *eb*, suitably polarized, is operated each time a "1" code element is received; when the counting chain progresses, make contact *eb2* is successively connected to relays *2b* . . . *7b* (FIG. 4*b*), each one being operated when the "1" element is received and remaining at rest when the "0" element is received. Contact combinations are associated with relays *2b* . . . *7b* and relays *3c*, *3d*, *5c*, *6c*, *7c* to energize one of the select magnets 1 to 13H, 1 to 13B and either of the additional magnets 14H and 14B at the concentrator.

It will be assumed in the following description that the called subscriber corresponds to select magnets 1H and 14H:

Relay 1a at the concentrator (FIG. 4a) prepares for itself a hold circuit through its make contact 1a1 as well as an energizing circuit for relay 2a; through its make contact 1a2, it operates relay em through resistance Re42, through its contact 1a5 (FIG. 4b, left), it prepares the reception of the first code element on relay 2b.

Relay em completes at em1 (FIG. 4a, right center) a hold circuit for relays ep, ce and cf; through make contact em2, a hold circuit is prepared for the code receiving relays; at em3, a hold circuit is completed; at em4, reception of the first code element on the counting chain is prepared.

Relay eg, which is delayed following opening of its pick-up circuit at cp2, restores, without any other effect.

At the exchange, relay ea′ (FIG. 3B) completes through its make contact ea′2 the following circuit: ground, make contact ea′2, break contacts 7a′2, 6a′2, 5a′2, 4a′2· 3a′2, 2a′2, relay 1a′, battery.

Relay 1a′ prepares through its make contact 1a′1 the reception of the first code element on the counting chain, through its make contact 1a′2, it operates relay em′ through resistance Re34.

Relay em′ completes through its make contact em′1 (FIG. 3a, right) a hold circuit for relays ep′, de and df; at em3 (FIG. 3b) it completes for itself a hold circuit; at em′4 it prepares the reception of the different code elements on the counting chain; at em′7, it completes the circuit of the second pulsating relay ek′: battery, upper winding of relay ek′, make contacts ej′3, em′7, ep′4, break contact 8a′1, make contact ef′2, ground.

Relay ek′, delayed by the looping of its lower winding on resistance Re35, operates after a while and breaks at ek′1 the circuit of relay ej′ which, being also delayed, restores after a while.

Relay ej′ breaks at ej′3 the circuit of relay ek′ which restores in its turn.

Relay ej′ is operated again through contact ek′1. The same cycle of operation takes place, relays ej′ and ek′ operating and restoring at a rate fixed by their delay time.

When relay ej′ restores for the first time, it breaks through its two make contacts ej′1 and ej′2 the line supply current, which causes restoring of relay ea′.

Following the position change of break-make contact ea′2, relay 1a′ holds itself and relay 2a′ is operated through following circuit: battery, relay 1a′, lower winding of relay 2a′, make contacts 1a′1 and em′4, break contact ea′2, ground.

Relay 2a′ prepares through its make contact 2a′1, operation of relay 3a′; by opening its break contact 2a′2, it prepares for the restoring of relay 1a′, which still holds in series with relay 2a′; through its make contact 2a′2, it prepares for itself a hold circuit when the line current is supplied again.

During this operation period, code relay el′ (FIG. 3a, lower right) is connected to wire B′ through make contacts ef′9 and 1a′3. In the example chosen, the called subscriber corresponds to select magnets 1H and 14H; wire B′ is therefore not grounded (see FIG. 6), so that relay el′ remains at rest.

From the preceding description, it is seen that a line supply current break has been made without substituting for said current a reverse one, the absence of current on line a—b corresponding to sending of the "0" element.

The transmission of the first code element being accomplished, supply current is restored by means of make contacts ej′1, ej′2, and relay ea′ operates again. By opening its break contacts ea′2, it breaks the hold circuit of relays 1a′ and 2a′; by closing its make contact ea′2, it completes following hold circuit for relay 2a′: battery, upper winding of relay 2a′, make contact 2a′2, break contacts 3a′2, 4a′2, 5a′2, 6a′2, 7a′2 make contact ea′2, ground. Relay 1a′ restores, but relay 2a′ remains energized.

Relays ej′ and ek′ keep on pulsating and the line supply current is broken a second time by make contacts ej′1 and ej′2 which causes restoring of relay ea′. Following the position change of break-make contacts ea′2, relay 2a′ holds itself and relay 3a′ is energized through following circuit: battery, upper windings of relays 2a′ and 3a′, make contact 2a′1, break contact 1a′1, make contact em′4, break contact ea′2, ground.

During this operation period, code relay el′ is connected to wire C′ through contacts ef′9, 1a′3, 2a′3, but this wire is open and relay el′ remains at rest.

Thus, for the second time, a break in the line supply current has been made without substituting for said current a reverse one, the absence of current on line a—b again corresponding to the sending of the "0" element.

The transmission of the second code element being accomplished, the supply current is restored by means of make contacts ej′1, ej′2 and relay ea′ is operated again. By opening its break contact ea′2, it opens the hold circuit of relays 2a′ and 3a′; by closing its make contact ea′2, it completes the following hold circuit for relay 3a′: battery, lower winding of relay 3a′, make contact 3a′2, break contacts 4a′2, 5a′2, 6a′2, 7a′2, make contact ea′2, ground. Relay 2a′ restores, but relay 3a′ remains operated.

The cycle of operations described previously is carried on in the same manner, the counting chain progressing one step each time a code element is transmitted towards the distant concentrator. Wire G′ being the only one grounded in the example chosen, the other wires H′, B′, C′, D′, E′, F′, I′ being isolated, relay el′ remains at rest during the operation of the different relays of the counting chain, 1a′, 2a′, 3a′, 4a′, 5a′; the first five code elements are thus "0" elements. However when the counting chain assumes the sixth position (relays 6a′ and 7a′ operated), relay el′ (FIG. 3a, lower right) is energized through following circuit: battery, relay el′, make contact ef′9, break contacts 1a′3, 2a′3, 3a′3, 4a′3, 5a′3, make contact 6a′3, wire G′, cable 15 (FIGS. 3a–2), fourth contact m of final selector STc, connected fourth wire 14 (FIGS. 2–3a), make contact de3, ground. By means of make contacts el′1, el′2 (FIG. 3b, middle) and break contacts ej′1, ej′2, a current is supplied to the line a, b in the reverse direction with respect to the normal supply current, corresponding to the transmission of the "1" code element. Finally the identification code transmitted to the distant concentrator will be:

0–0–0–0–0–1–

The following table gives the sequence of operation of the counting chain, in the chosen embodiment:

| Chain Position | Chain relay operated | Code Relay operated | Code trans-mitted |
|---|---|---|---|
| At rest | 1a′ | ---------- | |
| 1 | 1a′—2a′ | ---------- | 0 |
| 1 | 2a′ | ---------- | — |
| 2 | 2a′—3a′ | ---------- | 0 |
| 2 | 3a′ | ---------- | — |
| 3 | 3a′—4a′ | ---------- | 0 |
| 3 | 4a′ | ---------- | — |
| 4 | 4a′—5a′ | ---------- | 0 |
| 4 | 5a′ | ---------- | — |
| 5 | 5a′—6a′ | ---------- | 0 |
| 5 | 6a′ | el′ | — |
| 6 | 6a′—7a′ | el′ | 1 |
| 6 | 7a′ | ---------- | — |
| 7 (end) | 7a′—8a′ | ---------- | |

It is seen from this table, that there are provided one rest position, six active positions and one position 7 corresponding to the sending of the end of code signal. Each active position comprises 2 operating periods: during the first one (relays ej′ and ea′ at rest) two chain relays are operated in series and one code element "0" or "1" is sent; during the second period (relays ej and ea operated), only one chain relay remains operated and the normal supply current is sent to the line (minus sign indication in right hand column). Relay *el'* operates somewhat earlier than necessary, but this is not important since at this instant the two contacts *ej'*1 and *ej'*2 are in the make position and normal supply current is transmitted.

At the distant concentrator, the reception of each code element, be it at "0" or a "1" restores relay *ea* (FIG. 4*a*, middle). The counting chain comprising relays 1*a* . . . 8*a* steps forward following the same process as at the exchange, relays 2*a* . . . 7*a* being respectively operated at the beginning of reception of code elements No. 1 . . . 6.

The first five code elements received being "0," no particular operation is initiated. However the sixth element being a "1" corresponds to a reversal of the normal supply current, which causes operation of relay *eb*, suitably polarized by rectifier *Rd*44. Relay *eb* closes its make contact *eb*2 and completes the following circuit: ground, break contacts *ef*1, make contact *eb*2, break contact 8*a*3, make contact 7*a*4, lead 16 (FIGS. 4*a*–4*b*), make contact 6*a*5, wire G, relay 7*b* which operates, battery.

Thus, reception of code 0–0–0–0–0–1– is materialized at the concentrator by operation of relay 7*b*, the other relays of the set 2*b* . . . 6*b* remaining at rest. At 7*b*2, relay 7*b* completes for itself following hold circuit: battery, relay 7*b*, make contacts 7*b*2, *em*2, lead 17 (FIGS. 4*b*–*a*), ground; at 7*b*1 it prevents subsequent operation of relay 7*c* (FIG. 4*b*, middle).

Break contacts *ea*1 and *eb*1 (FIG. 4*a*) have been provided to prevent mutual shunting of relays *ea* and *eb*, which would delay their operation.

After transmission of the called subscriber identification code, the send-receive device EC of the exchange sends a transmission termination signal characterized by a break of the normal supply current. This break is accomplished like the preceding ones by means of the two make contacts *ej'*1 and *ej'*2 (FIG. 3*b*), since relays *ej'* and *ek'* keep on pulsating. The last relay 8*a'* of the counting chain is operated in the same manner as the preceding relays. Through its break contact 8*a'*1, relay 8*a'* breaks the circuit of the two pulsating relays *ej'* and *ek'* which finally restore; through its make contact 8*a'*1, it completes the following circuit: battery, slow operating relay *dc* (FIG. 3*b*, upper left), make contacts *de*3, 8*a'*1, *ef'*2, ground; at 8*a'*5 it breaks definitively the supply current of the line wires.

Relay *dc*, by opening its break contacts *dc*1 and *dc*7, removes all unnecessary shunting across the line wires *a* and *b*; by closing its make contacts *dc*1 and *dc*5; it prepares the ringing and the talking circuit; through its break contact *dc*2, it opens the circuit of relay *ef'*, which restores; through its make contact *dc*2, it completes for itself the following hold circuit: battery, relay *dc* windings in series, make contacts *dc*2 and *dt*2, ground; at *dc*3 (FIG. 3*a*) it completes a hold circuit for hold magnet TV of the final selector ST*c* and prepares an energizing circuit for relay *dl*.

During the transmission of the identification code, relay *em'* (FIG. 3*b*, left) undergoes brief short-circuits through break contacts 1*a'*2 and *ea'*3, but being delayed because of said short-circuits, it remains operated. At the ending of the identification code transmission, it restores, being short-circuited during a long period through the break contacts mentioned in the foregoing. By opening its make contact *em'*1 (FIG. 3*a*, right), it breaks the hold circuit of relays *ep'*, *de* and *df*; at *em'*4 (FIG. 3*b*) it breaks the hold circuit of relays 7*a'* and 8*a'*, which restore.

The send receive device EC of the exchange, whose function is now ended, is cleared and stands ready for another call.

At the distant concentrator, the reception of the ending signal steps the counting chain (FIG. 4*a*) to its eighth position (relay 8*a* operated). At 8*a*2 (FIG. 4*b*), relay 8*a* completes the 4 following circuits.

(1) Battery, relay 3*d*, break contact 3*b*1, make contacts 8*a*2, lead 17 and contact *em*2, ground;

(2) Battery, relay 5*c*, break contact 5*b*1, make contacts 8*a*2 and *em*2, ground;

(3) Battery, relay 6*c*, break contact 6*b*1 and circuit previously mentioned;

(4) Battery, additional magnet 14H, break contact 2*b*1, make contacts 8*a*2 and *em*2, ground.

Relays 3*d*, 5*c*, 6*c* as well as the additional magnet 14H are operated.

Relay 8*a*, by opening its break contact 8*a*4, breaks definitively the reception relays *ea* and *eb* (FIG. 4*a*).

There are 13 select magnets 1H . . . 13H (FIG. 4*b*) which are respectively connected to wires 1 . . . 13 through make contacts 3*d*1 . . . 3*d*13 and 13 select magnets 1B . . . 13B which are respectively connected to wires 1 . . . 13 through make contacts 3*c*1 . . . 3*c*13.

In the example chosen, select magnet 1H is operated through following circuit: battery, magnet 1H, make contact 3*d*1, wire 1, make contacts 7*b*4, 6*c*1, 5*c*1, break contact 4*b*1, ground.

When the select magnet 1H and the additional magnet 14H are operated, hold magnet CV of the final selector ST*c* is operated: battery, right hand side winding of hold magnet CV, make contacts *ce*3, 1H2, 14H2, ground. Magnet CV causes connection of final selector ST*s* on a position corresponding to the combination determined by the two magnets 1H and 14H, i.e. on a position identical to that of final selector ST*c* located at the exchange. By opening its break contacts *cv*1 and *cv*2 (FIG. 4*a*), it removes all unnecessary shuntings on the line wires; through its make contacts *cv*1 and *cv*2 it extends, as follows, the connection between the fifty selector SC located at the exchange and the called subscriber: wire *a* coming from the fifty selector (FIG. 2), make contact *dc*1, wire *a*, make contact *cv*1, contact *a* (FIG. 4*b*) of final selector ST*s*, called subscriber, contact *b* of final selector ST*s*, make contact *cv*2, wire *b*, make contact *dc*5, wire *b* towards the fifty selector; at *cv*4, it causes the operation of relay *lt* (FIG. 5) through contact *t* of the final selector; at *cv*6 (FIG. 4*a*, top), it breaks the circuit of relays *cf*, *ce* and *ep* which initiates the different operations relating to the clearing of send-receive device ES.

Relay *lt* (FIG. 5), corresponding to the called subscriber, opens its break contacts *lt*1 and *lt*2 in order to remove all unnecessary shuntings across the line wires.

Relay *ce*, while restoring, opens through its contact *ce*3 the energizing circuit of magnet CV (FIG. 4*b*), but this latter holds itself through following circuit: battery, windings in series of CV, make contact *cv*3, break contact *cl*2, ground.

During reception of the called subscriber's identification code, relay *em* (FIG. 4*a*) is submitted to brief short-circuits through break contact *la*2 and *ea*3; but being delayed because of these short-circuits, it holds itself. After complete reception of the identification code and the ending signal, it is short-circuited during a long period by the break contacts mentioned previously and restores. Reopening its make contact *em*2 opens the circuit of relays 7*b*, 3*d*, 5*c*, 6*c* and the hold magnet 14H; at *em*4 it opens the circuit of relays 7*a* and 8*a*.

The select magnet 1H1 restores, having its circuit opened by restoration of the different contacts 7*d*1, 7*b*4, 6*c*1 and 5*c*1.

As mentioned previously, relay *eg* had its circuit opened at *cp*2 (FIG. 4*a*, top) as soon as relay *cp* has restored, i.e. immediately before the reception of the identification code; but being delayed because of short-circuiting of its right-hand side winding, it remains operated during a certain period and restores only when relay *ep* (FIG. 4*a*, right center) is definitely operated by *em*1.

Send-receive device ES at the concentrator is completely cleared and ready to handle another call.

As mentioned, connection of line wires is extended between the primary stage located at the exchange and the subscriber connected to the concentrator. The supply device (AL in FIG. 1) sends now ringing current to the said subscribed, and when this latter answers, the connection is established between the two subscribers.

In case of a party line, the supply device, knowing the subscriber's rank on this line, sends following a well-known process, a ringing current having suitable characteristics to select the subscriber. No additional operations of the equipments, subject of the invention, are needed to make the connection between subscribers.

The same goes for lines grouped under the same number (PBX line). The local part ST*c* of the final selector is positioned on an idle line of the group following a known process; the distant part ST*s* itself sets on a corresponding position and nothing is changed in the operation of the equipments.

It will be now assumed that the calling subscriber hangs up first. At the exchange, the supply device detects this action and orders the clearing. This action is materialized by the removal of ground on wire *t* (FIG. 2–3*a*) of the primary stage, which causes restoring of relay *dt*. Through its break contact *dt*1, relay *dt* completes the following circuit: battery, relay *dl* which operates, break contact *dt*1, make contact *dc*3, ground; by its make contact *dt*2, it breaks the circuit of relay *dc* (FIG. 3*b*, top), but this latter having a delayed restoring, holds itself through following circuit: battery, windings of relay *dc* in series, make contact *dc*2, break contact *dt*2, make contact *dc*1, wire *a*, make contact *cv*1 (FIG.4*a*), contact *a* of final selector ST*s*, make contact *cv*2 (FIG. 4*b*), called subscriber loop, wire *b* (FIG. 4*a*), wire *b*, make contact *dc*5 (FIG. 3*b*), make contact *dc*4, break contact *dt*4, master relay *pp* which operates, ground. A busy signal is then sent to the called subscriber through the previously described circuit, in order to inform said subscriber to hang up his receiver.

Relay *dl*, through its make contact *dl*2, prepares the sending of a clearing signal toward the distant concentrator; through its make contact *dl*1, it prepares the reception of the all clear signal; at *dl*3 (FIG. 3*a*, upper), it completes for itself following hold circuit: battery, relay *dl*, make contact *dl*3, break contact *dk*4, ground. At the same time, it completes through this same contact *dl*3 the following hold circuit for hold magnet TV (FIG. 2) of final selector ST*c*: battery, windings of TV in series, make contact *tv*1, break contact *dt*1, make contact *dl*3, break contact *dk*4, ground.

When the called subscriber hangs up his receiver, relays *pp* and *dc* (FIG. 3*b*) restore. At *dc*7, relay *dc* causes the sending of a clearing signal towards the distant concentrator through following circuit: positive potential V1, resistance R*e*36, make contact *dl*2, break contact *dc*7, wire *b*; through its break contact *dc*1, it prepares the reception of the all clear signal.

At the distant concentrator, positive potential V1, characterizing the clearing signal, is received on wire *b* and extended to the anode of the gas filled tube T*b* (FIG. 4*a*), through a resistance of suitable value R*e*42. The cathode to this tube is connected to the battery through relay *cl* and resistances R*e*43 and R*e*44 connected in parallel through break contact *cl*1. Immediately before the reception of the clearing signal, the high capacity condenser C*d*41 is discharged; the control electrode of tube *Tb* is at battery potential and said tube is off. During reception of the clearing signal, condenser C*d*41 is charged through a high resistance R*e*45 and the potential of the left hand side terminal of said condenser rises exponentially toward V1. When this potential corresponds to the tube ignition potential, the tube is turned on and relay *cl* operates. The respective values of condenser C*d*41 and resistance R*e*45 are chosen so that the ignition occurs after a certain time, approximately 2 seconds, in order to avoid undesirable clearing due to discharges in the line. Relay *cl* removes through its break contact *cl*1 the low resistance R*e*44 from the cathode circuit, leaving only the high resistance R*e*43 in order to limit the power consumption; through its make contact *cl*1, it causes the rapid discharge of condenser C*d*41 through the low resistance R*e*44; through its break contact *cl*2, it opens the hold circuit of hold magnet CV (FIG. 4*b*) of the final selector, which restores; at *cl*3, it opens the circuit of relay *cf* (FIG. 4*a*, top) in spite of closing of contact *cv*6, to prevent another undesirable operation of said relay before complete clearing.

When hold magnet CV of final selector ST*s* restores, it causes the opening of the different contacts *a*, *b*, *t* of said selector, and consequently the restoring of relay *lt* (FIG. 5); through its break contact *cv*5, it extends ground from contact *cl*2 (FIG. 4*a*) to wire *a*; transmitting thus toward the exchange the all clear signal.

At the exchange, the all clear signal is received through following circuit: wire *a*, break contacts *dc*1 (FIG. 3*b*) and *de*10, make contact *dl*1, lead 18 (FIGS. 3*b*–*a*), rectifier R*d*36, left hand side winding of relay *dk* which operates, battery. A rectifier has been provided in order to prevent undesirable operation of relay *dt* through contact *dk*2. Through its make contact *dk*1, relay *dk* prepares itself a hold circuit which becomes effective after opening of make contact *dl*1; at *dk*4, it opens the hold circuit of relay *dl* and hold magnet TV.

Relay *dl*, by opening its make contact *dl*2 (FIG. 3*b*, top), cuts off the sending of the clearing signal toward the distant concentrator.

The hold magnet TV (FIG. 2), while restoring, opens contacts *c*, *t*, and *m* of final selector ST*c*, which causes restoring of relay *nt* (FIG. 3*a*).

When the reception of the clearing signal is ended at the distant concentrator, anode of tube T*b* (FIG. 4*a*) is opened; said tube is thereupon turned off and relay *cl* restores. By opening its make contact *cl*2, it stops the sending of the all clear signal towards the exchange.

At the exchange, relay *dk* restores when the all clear signal stops.

If the called subscriber hangs up first, the exchange supply device detects this operation and can initiate the clearing either immediately or after the hanging up of the calling subscriber. This control is materialized by ground removal from wire *t* extending from the primary stage and everything goes on as in the previously described case, with the difference that relay *dc* (FIG. 3*b*, upper left) cannot hold itself through the called subscriber loop, thereby causing immediate sending of the clearing signal through make contact *dl*2 and break contact *dc*7.

After having dealt with the general case of a call toward a subscriber connected to the concentrator, different particular cases will now be described, which are liable to occur during the extension of that call.

In case the called subscriber is busy, marking on the final selector outlet cannot occur, because of the opening of contacts *nt*1 and *nt*2 (FIG. 3*a*) relative to this subscriber and setting of the fifty selector as well as the final selector cannot occur. Nothing happens in the equipments shown in FIGURES 2 to 5.

In case the call cannot be extended for some reason, a delay device has been provided which initiates the clearing of the different equipments after a given period. As soon as the send-receive device EC is seized, relay *ep'* operates, as mentioned before, and the large capacity condenser C*d*31 (FIG. 3*b*, bottom) charges through following circuit: battery, resistance R*e*37, condenser C*d*31, make contact *ep'*1, ground. If the call has not been extended after a given period, this latter being fixed by suitably choosing the values of C*d*31 and R*e*37, condenser C*d*31 is charged and relay *mt* is operated. At *mt*1, relay *mt* completes the following circuit: battery, relay *my*, break contact *mw*1, make contact *mt*1, wire *p* and starting relay of a trouble hunter (not shown). Relay *my* operates in series with the starting relay of said hunter.

A trouble hunter of the kind previously mentioned comprises mainly individual multiswitch crossbar selectors which set themselves on the faulty apparatus, as well as a certain number of memory devices which store the information relative to the identity of the faulty apparatus and the position of its main relays. This information appears then on perforated cards and may be made use of in any desirable manner to point out the faults and also for statistics aims. In the figure, the cross surrounded by a circle indicates a wire terminated at the trouble hunter.

When the trouble hunter finds a ground on wire *a* through contact *my*2, it connects itself to the equipment under consideration and grounds wire *c*, which causes operation of relay *mw* in series with relay *my*.

At *mw*2, relay *mw* completes itself the following hold circuit: battery, lower winding of relay *mw*, make contacts *mw*2 and *mt*2, ground. The two wires *id* and *id'* are grounded through contacts *mw*3 and *mw*4 in order to send toward the trouble hunter an indication characterizing the identity of the send-receive device EC. If it is assumed that there are only ten send-receive devices, a single figure number can be ascribed to send of them. To transmit this figure there are five wires in the trouble hunter, a given send-receive device transmitting its number by grounding two and only two of these wires. Each send-receive device has thus wires *id* to transmit its number.

Relay *mw* grounds wire *ca*2 (FIG. 3*b*, upper left) relative to the seized junctor JC, through the make contacts *mw*6, *my*1 and *de*9, in order to inform the trouble hunter about the identity of said junctor; wire *ca*1 (FIG. 3*b*, bottom) is grounded through contacts 8*a'*4 and *mw*5 in case the identification code has been sent, in order to inform the trouble hunter of the progress of the call.

When all useful information has been stored in the trouble hunter, this latter is cleared out and removes the ground from wire *c*, which causes restoring of relay *my*, but relay *mw* holds itself on its lower winding, as already mentioned.

By its break contact *my*1, relay *my* completes the following circuit: battery, windings in series of relay *dc*, which operates, make contact *de*3, break contact *my*1, make contact *mw*6, ground.

Relay *dc*, by opening its break contacts *dc*1 and *dc*7, causes restoring of relay *ea'*. Relay *em'*, short-circuited for a long time at *ea'*3, restores; relay *ef'*, having its circuit opened by break contact *dc*2, restores at its turn and clearing out of the send receive device EC is accomplished as already mentioned. This avoids the unnecessary holding up of the send receive device if it is not faulty.

Until the clearing of the send receive device is not accomplished, contact *mw*1 remains opened in order to prevent the connection of the trouble hunter to another apparatus. After the clearing, relay *mt*, having its circuit opened by the make contact *ep'*1, restores, breaking at *mt*2 the circuit of relay *mw* which restores at its turn.

In the example chosen, it has been assumed that the called subscriber corresponded to select magnets 1H and 14H, but it is understood that the case of another subscriber can be dealt with in the same manner. Thus, if the called subscriber corresponds to select magnets 13B and 14B for instance, the wires B', H', I' (FIG. 3*a*) are grounded through contacts *m* of final selector ST*c* as shown in the table of FIG. 6. Under these circumstances, the transmitted code will be as follows:

–1–1–1–1–1–0–

At the concentrator, the operated relays will then be the following: 2*b* to 6*b*, 3*c*, 7*c*. Under these circumstances, magnet 13B is operated through following circuit: battery, magnet 13B, make contact 3*c*13, wire 13, make contacts 5*b*6, 6*b*6, 7*c*1, 4*b*1, and ground; magnet 14B is operated through make contact 2*b*1.

As appears from the consideration of the contact pyramids of FIGURE 4*b*, the different codes have not been chosen in a random way. The first code element selects the additional magnet (14H or 14B); the second code element selects one set of 13 magnets (1 to 13H or 1 to 13B); the third code element selects one-half set—magnets 1 to 7 or 8 to 13); finally the last three code elements complete the selection.

At the exchange (FIG. 3), rectifiers have been provided to prevent interaction between wires C' and D' (FIG. 3*a*, lower right) on one hand and wires E' and F' on the other hand.

It is understood that the table of FIG. 6 has been given only by way of example and not as a limitation to the scope of the invention. However, as soon as a given table has been adopted, it is always possible to arrange suitably the contact pyramids located at the concentrator to obtain the operation of the select magnets corresponding to those which have been operated at the exchange. This latter condition is not even necessary, and other magnets could be operated; these lead to different arrangements of the subscribers at the concentrator and at the exchange. The only point which has to be respected is the setting of the final selectors, at the exchange and at the concentrator, on the same subscriber.

Referring now to FIGS. 2, 3*a* and *b*, 4*a* and *b*, 5, 19 the case of a call originated by a concentrator subscriber will be dealt.

The 52 subscribers served by the concentrator are divided into 4 groups having each 13 subscribers. Each 13 subscriber group is subdivided into 2 sub-groups, the first one comprising 7 subscribers and the second one 6 subscribers.

At the concentrator, there has been provided an identification matrix MI (FIG. 5) having a dual function; it detects the initiation of a subscriber call and stores 3 distinct items of information, the first one relative to the group of the said subscriber, the second one relative to his sub-group and the third one relative to his rank inside the sub-group. Means are provided to register only one call at a time even if several calls are initiated simultaneously.

In order to make the following explanations easier, part MI1 of this matrix inside the dot and dash lines (FIG. 5) has been shown with more details in FIG. 19, so that the description of the operation refers to FIGS. 5 and 19.

This matrix comprises a set of relays *lx*1 . . . *lx*4 to receive the information relative to the subscriber's group, a set of relays *ly*1 and *ly*2 for the sub-group and finally a set of relays *lz* . . . *lz*7 for the rank inside the sub-group. As soon as one of these items of information is received, it is transferred to another set of relays which stores it, storing only one item of information if several are received at the same time. Relays *la*1 . . . *la*4 have been provided for storing the group, relays *lb*1 and *lb*2 for the sub-group and relays *lc*1 . . . *lc*7 for the rank inside the sub-group.

When a subscriber lifts his handset, following circuit is completed: ground, one of relays *lx*1 . . . *lx*4, one of rectifiers R*d*51 . . . R*d*54, wire *f*2 corresponding to said subscriber, break contact *lt*1, wire *a*, the subscriber's loop, wire *b*, break contact *lt*2, resistance R*e*51, battery. Four relays *lx* have been provided, each one being graded on 13 subscribers forming a group. The relay *lx* which operates thus characterizes the calling subscriber's group. It will be assumed, in order to make the following explanations easier, that calling subscriber's group is the first among the 4 groups. Relay *lx*1 therefore is operated.

The first contact of relay *lx*1 (*lx*1/1) is closed and following circuit is completed; battery, relay *la*1, which operates, break contact *la*2/16, make contact *lx*1/1, break contacts *la*4/1, *la*3/1, ground. There are four relays *la*1 . . . *la*4 which correspond respectively to the four subscriber groups; the operation of a relay *la* indicates that there is a call in the corresponding group and registers this call; arrangements are provided so that relays *la*1 . . . *la*4 break one another, so that the call of only one group can be registered at a given moment. Thus, for example, circuit of relay *la*1 is broken by break contacts *la*2/16, *la*3/1 and *la*4/1 associated respectively with *la*2 . . . *la*4; in the same manner circuit of relay *la*4 is broken by the break contacts associated respectively with the three other relays.

At *la*1/15, relay *la*1 prepares for itself a hold circuit; through its 13 contacts *la*1/2 . . . *la*1/14 it extends respectively wires *f*2 of the first group subscribers to the 13 wires *f*15, in order to prepare the reception of the sub-group information.

The following circuit is then completed: ground, one of the relays *ly*1, *ly*2, one of the rectifiers R*d*55, R*d*56, one of the wires *f*15, one of the 13 make contacts *la*1/2 . . . *la*1/14, wire *f*2 and battery through a circuit already described. There are two relays *ly*1 and *ly*2; the first one is multiplied on the first 7 wires *f*15; the second one is multiplied on the last 6 wires *f*15; the relay *ly*1 or *ly*2, whichever which operates, thus characterizes the calling subscriber's sub-group. It will be assumed that the said subscriber belongs to the first sub-group which corresponds to operation of relay *ly*1.

Relay *ly*1, through its make contact *ly*1/1 completes the following circuit: battery, relay *lb*1, break contact *lb*2/1, make contact *ly*1/1, ground. There are two relays *lb*1 and *lb*2 which correspond in each group to the two subscriber sub-groups; when a relay *lb* operates, it indicates that there is a call in the corresponding sub-group and it registers this call. As explained for relays *la*, relays *lb*1 and *lb*2 cut out each other, so as to register only the call of a single sub-group at a given instant. Through its make contact *lb*1/9, relay *lb*1 prepares for itself a hold circuit; through its make contacts *lb*1/2 . . . *lb*1/8, it connects the first seven wires *f*15 to the 7 wires *f*16, to prepare the reception of the information of the subscriber's rank inside the sub-group. The following circuit is thereupon completed: ground, one of relays *lz*1 . . . *lz*7, one of the make contacts *lb*1/2 . . . *lb*1/8, wire *f*15, make contact *la*1/2, wire *f*2 and the circuit already mentioned. There are 7 relays *lz* corresponding each to a subscriber's rank inside a sub-group. The operating relay *lz* thus indicates the rank of the calling subscriber. It will be assumed for instance that the calling subscriber corresponds to rank one in the first sub-group of the first group; therefore relay *lz*1 will operate.

When relay *lb*1 is operated, following circuit will be completed: battery, break contact *lc*1/1 . . . , make contact *lc*7/1, break contact *le*1, relay *ld*, break contact *lm*1, make contacts *lb*1/9 and *ly*1/1, ground.

Relay *ld* is operated. At *ld*1 it completes the circuit for relay *lc*1 through make contact *lz*1/1. There are seven relays *lc* corresponding respectively to the seven subscribers of each sub-group; if relay *lc*1 operates, it indicates that subscriber No. 1 has lifted his receiver and registers the call. It is understood that relay *lc*7 remains idle in each sub-group comprising only 6 subscribers. Relay *ld* completes itself a hold circuit at *ld*8.

Relay *lc* completes for itself a hold circuit through its make contact *lc*1/1; through its break contact *lc*1/1, it prevents the completion of a similar hold circuit for the other relay *lc* in order to avoid registration of several calls corresponding to subscribers of different ranks; through its make contact *lc*1/2, it completes the following circuit: ground, relay *le* which operates make contact *lc*1/2, break contact *lc*7/6, battery.

Relay *le* breaks at *le*1 the circuit of relay *ld*, which restores; at *le*2, it initiates the seizure of send-receive device ES, following circuit being completed: battery, make contact *le*2, lead 20 (FIGS. 5–4*b*–4*a*, bottom), resistance R*e*46, relay *ef* which operates, break contacts *em*6, *eh*1, *eg*1, ground.

From the foregoing explanations, it appears that the different elements of the calling subscriber's number have been stored on three relays, relay *la*1 characterizing the group (1st group), relay *lb*1 characterizing the sub-group (1st sub-group) and relay *lc*1 characterizing the subscriber's rank inside the sub-group (1st rank). Wire G′ (bottom of FIG. 4*b*) is grounded through contact *lc*1/5, which prepares the transmission of the identification code toward the distant exchange.

Operation of relay *ef* (bottom of FIG. 4*a*) controls the seizure of send-receive device ES as "send" device. In the case under consideration, it is up to the concentrator to send the identification code toward the exchange; respective functions of send-receive devices EC and ES are thus reversed. At *ef*5, relay *ef* completes itself a hold circuit; by its make contact *ef*1, it prepares the circuit of relays *ep*, *ce* and *ef*; through its make contacts *ef*2, *ef*3 and *ef*8, it prepares the transmission of the different seizure signals and identification signals towards the exchange; at *ef*4 (FIG. 4*a*, bottom), it prepares the circuit of relay *lm* (FIG. 5); at *ef*6 (FIG. 4*a*, upper right), it completes the following circuit: ground, break contacts *em*2, 8*a*3, 7*a*4, 6*a*4, 5*a*4, 4*a*4, 3*a*4, 2*a*4, *la*4, lead 14, 14B1 . . . 1H1, lead 13, *ep*1, make contact *ef*6 and in every idle junctor JS associated with send-receive device ES, break contact *cp*1, right hand side winding of relay *cf*, which operates, break contacts *cl*3 and *cv*6, resistance R*e*41, battery; et *ef*7 (FIG. 4*a*, left), relay *ef* breaks the circuit of relay *eg* to prevent seizure of equipment ES as receive device.

Break contacts *cf*1 of relays *cf* belonging to different junctors JS served by send-receive device ES are arranged chainwise, so that one relay *cf* and only one can hold itself through following circuit: battery, resistance R*e*41, break contacts *cv*6 and *cl*3, left hand side winding of relay *cf*, relay *ce*, which operates, make contact *cf*1, contact of distributor DI in position 1, relay *ep* which operates, make contact *ef*1, ground. The other relays *cf* have their hold circuit opened by the break contacts *cf*1 located upward in the chain. A junctor JS is thus chosen, and consequently a junctor circuit, to transmit the identification code toward the exchange.

Relay *ce* extends the connecting wires from junctor JS to the send-receive device ES, by means of the different make contacts *ce*2, *ce*1, *ce*3.

Relay *ep* breaks at *ep*1 the initial energizing circuit of all relays *cf*, one of them only holding itself as mentioned; at *ep*3, it causes operation of relay *lm* (bottom of FIG. 5), lead 21 (FIGS. 5–4*b*–4*a*); battery, relay *lm*, break contact 8*a*1, make contacts *ep*3 and *ef*4, ground; at *ep*2 it sends a pulse toward distributor DI, preparing thus the forward stepping of said distributor.

Relay *lm* completes a hold circuit for each of the relays having stored the elements of the calling subscriber's number:

(1) Battery, relay *la*1, break contacts *la*2/16, make contacts *la*1/15 and *lm*2, ground;

(2) Battery, relay *lb*1, break contact *lb*2/1, make contacts *lb*1/9, and *lm*1, ground;

(3) Battery, make contact *lc*1/1, relay *lc*1, make contact *lm*4, ground.

Under these circumstances, the subscriber's call remains stored even if said subscriber hangs up. Faulty code sending is thus prevented, in case the subscriber hangs up while another subscriber lifts his handset during successive sending of the code elements.

Relay *ej* (FIG. 4, lower left) has its energizing circuit completed as soon as relay *ep* operates; battery, right hand side winding of relay *ej*, break contacts *ek*1 and 8*a*1, make contacts *ep*3 and *ef*4, ground; but being slow operating because of short-circuiting of its left-hand winding through resistance R*e*47, it operates only after a while. Through its make contacts *ej*1 and *ej*2, it supplies current to the line wires *a* and *b*, which corresponds to the sending of a seizure signal toward the distant exchange: ground, make contacts *ej*2 and *ef*2, make contact *ce*2, break contact *cv*2, wire *b*, wire *a*, break contacts *cv*1 and *cv*4, make contacts *ce*1 and *ef*8, rectifier R*d*41, relay *ea* (which remains at rest), break contacts *eb*1 and 8*a*4, make contacts *ef*3 and *ej*1, resistance R*e*48, battery.

At the distant exchange, the seizure signal is received on relay *dp* (FIG. 3*b*): battery, wire *a*, break contacts *dc*1, *de*10, *dl*1, *dk*1, *de*1, relay *dp* break contacts *de*2, *dl*2, *dc*7 and wire *b*. Relay *dp* is operated through this circuit but relay *ea* at the concentrator remains at rest, because of the highly resistive winding of relay *dp*. At *dp*1 (FIG. 3*a*, upper right), relay *dp* completes the following circuit: battery, left hand side winding of relay *df* which operates, break contact *dc*6, make contact *dp*1, break contacts *ep'*2, 1*a'*4, 2*a'*4, 3*a'*4, 4*a'*4, 5*a'*4, 6*a'*4, 7*a'*4, 8*a'*3, lead 10, *em'*5, ground; at *dp*2 (FIG. 3*b*, upper right), relay *dp* completes the following circuit: ground, make contact *dp*2, break contacts *np*26 and *ef'*5, left-hand side winding of relay *eg'*, which operates, battery. Relay *df* (FIG. 3*a*, top) sticks through the following hold circuit: battery, right hand side winding of relay *df*, relay *de*, which operates, make contact *df*1, relay *ep'*, which operates, make contact *eg'*2, ground.

Relay *eg'* operation characterizes the seizure of equipment EC as receive device. It short-circuits its right hand side winding through *eg'*3 (FIG. 3*b*, right), which makes it slow-restoring; at *eg'*1 (FIG. 3*b*, left), it breaks relay *ef'* circuit, in order to prevent the seizure of equipment EC as send device; at *eg'*4 it causes operation of relay *ei'*.

Relay *ei'* prepares for itself a hold circuit at *ei'*1; at *ei'*2, it prepares an energizing circuit for relay *np* (FIG. 3*a*, lower center).

Relay *de* opens by its break contacts *de*1 and *de*2 the circuit of delay *dp* (FIG.3*b*, top), which restores; it extends the connection wires from junctor JC to send-receive device EC, by means of its make contacts *de*10, *de*3, *de*1, *de*2; thus, the following circuit is completed: battery on wire *a*, break contacts *dc*1, make contact *de*10, make contact *de*1, break contacts *ef'*6, *ef'*4, 8*a'*5, *eb'*1, relay *ea'*, which operates, rectifier R*d*32, break contact *ef'*7, make contact *de*2, break contacts *dl*2 and *dc*7, wire *b*. Line wires *a* and *b* of the exchange which were previously looped on highly resistive relay *dp*, are now looped on low resistance relay *ea'*, which corresponds to the sending of the dial tone signal towards the distant concentrator.

Relay *ep'*, through its break contact *ep'*2 (FIG. 3*a*, right), opens the initial energizing circuit of relay *df*, but this latter holds itself in series with relay *de*, as already mentioned.

Relay *dp* (FIG. 3*b*, upper center), while restoring, opens at *dp*2 the energizing circuit of relay *eg'*, but this latter being slow-restoring because of its right hand winding which is short-circuited, remains operated for a while.

Relay *ea'* completes through its make contact *ea'*2 the following circuit: battery, relay *la'*, which operates, break contacts 2*a'*2, 3*a'*2, 4*a'*2, 5*a'*2, 6*a'*2, 7*a'*2, make contact *ea'*2, ground.

Relay *la'* completes by its make contact *la'*2 the circuit of relay *em'* through resistance R*e*34.

Relay *em'* completes itself a hold circuit at *em'*3; through its make contact *em'*1 it completes a hold circuit for relay *ep'* (FIG. 3*a*); at *em'*2, it prepares the circuit of relay *np* which indicates the end of the identification code transmission; at *em'*8, it completes following hold circuit for relay *ei'* (FIG. 3*b*, right center); battery, relay *ei'*, make contacts *ei'*1 and *em'*8, ground.

At the distant concentrator, the lowering of the loop resistance of line wires *a* and *b* causes operation of relay *ea* (FIG.4*a*). Through its make contact *ea*2, relay *ea* causes operation of relay *la* through a circuit similar to that already described for relay *la'* of the exchange.

Relay *la* completes the energizing circuit of relay *em* through its make contact *la*2, and resistance R*e*42.

Through its make contact *em*1, relay *em* completes a hold circuit for relay *ep*; at *em* 3 it completes itself a hold circuit; at *em*5 it initiates the operation of the two pulsating relays *ej* and *ek* following a process already described for relays *ej'* and *ek'* of the exchange.

The identification code characterizing the calling subscriber will now be transmitted from the concentrator towards the exchange. The codes used are the same as those used to transmit the calls from the exchange towards the concentrator.

Relay *ej*, by releasing its make contacts *ej*1 and *ej*2 at regular intervals, breaks line wires *a* and *b*, which causes a pulsating operation of relay *ea* at the concentrator and relay *ea'* at the exchange.

By its set of make-break contact *ea*2, relay *ea* steps forward the counting relay chain comprising relays 1*a* . . . 8*a*, following a process already described. As mentioned, the three elements characterizing the calling subscriber's number have been stored on relays *la*1, *lb*1 and *lc*1 (FIG. 5); consequently wire G' is grounded through make contact *lc*1/5 (bottom of FIG. 4*b*), the other wires B' to F' remaining isolated. When the counting chain steps forward, relay *el* (FIG. 4*a*, center right) is successively connected to wires B' . . . G' by means of the make contact set 1*a*3 . . . 6*a*3. During the first five line openings, relay *el* remains at rest since wires B' to F' are isolated; make contacts *el*1 and *el*2 remain opened. Therefore no current is supplied to the line, which corresponds to the transmission of the "0" code element. However during the sixth opening, relay *el* is operated, causing thus through *el*1 and *el*2 a reverse current supply, which corresponds to the "1" code element. Finally, the identification code transmitted to the exchange is:

–0–0–0–0–0–1– the dash represents, as already mentioned, the normal supply current.

At the exchange, the line openings cause a pulsating operation of relay *ea'* (FIG. 3*b*, middle) and this latter, through its make-break contact set *ea'*2 steps forward the counting chain 1*a'* . . . 8*a'*, following a process already mentioned. Reception of the first five code elements, which are "0," does not initiate any particular operation; however reception of the sixth element, which is at "1," causes the operation of relay *eb'*, suitably polarized by rectifier R*d*34. For the code reception at the exchange, there are provided 6 relays 2*b* . . . 7*b* (FIG. 3*a*, middle), connected respectively to wires B . . . G. These latter are connected through make contacts of the counting chain, to a make contact *eb'*2 (FIG. 3*a*, right) of relay *eb'* (FIG. 3*b*, middle) which receives the "1" code element. Reception of the first five code elements does not affect relay 2*b* . . . 6*b* of FIG. 3*a*, since the make contact *eb'*2 remains opened; however reception of the sixth element causes operation of relay 7*b* through the following circuit; ground, break contact *ef'*1, make contact *eb'*2, break contact 8*a'*3, make contacts 7*a'*4 and 6*a'*5, wire G, relay 7*b*, battery.

Relay 7*b* completes itself at 7*b*1 (FIG. 3*a*, middle), the following hold circuit: battery, relay 7*b*, make contact 7*b*1, make contacts *em'*2 and *ei'*2, ground; at 7*b*2 it prevents operation of relay 7*c*.

Receiving relays 2*b* . . . 7*b* (FIG. 3*a*) at the exchange have a certain number of contacts forming two decoding pyramids PY1 and PY2. In order to make the design of these pyramids easier, the three last receiving relays 5*b*, 6*b* and 7*b* are doubled by three relays 5*c*, 6*c* and 7*c* which operate only when the corresponding receiving relays are at rest. Pyramid PY1 has only contacts associated with relays 2*b* and 3*b* which receive the first two code elements; its function is to find out the "13" group to which the calling subscriber belongs. Pyramid PY2 has only contacts associated with relays 4*b*, 5*b*, 6*b*, 7*b*, 5*c*, 6*c*, 7*c*, which receive the last four code elements; its function is to select the calling subscriber inside its group.

The calling subscriber's number remains stored on relay 7*b*, but nothing happens at the exchange until the reception of the end of identification code transmission signal.

When the identification code transmission is over, the counting chain located at the concentrator assumes the last position and relay 8a (FIG. 4a) is operated. Through its break contact 8a1 (bottom of FIG. 4a), it opens the circuit of relay lm (FIG. 5), which restores, as well as the circuit of the pulsating relays ej and ek (FIG. 4a) which restore definitely; by its make contact 8a1 it completes the following circuit: ground, make contacts ef4, ep3, 8a1, upper winding of relay eh which operates, lead 20 (FIGS. 4a–4b–5), make contact le2, battery; at 8a4 (FIG. 4a, middle), it prevents the supply of the normal line current after the seventh opening; relay ea stops its pulsating operation and restores definitely.

Relay eh opens through its break contact eh1 the hold circuit of relay ef, which restores; through its make contact eh1, it completes itself following hold circuit: battery, lower winding of relay eh, make contact eh1, break contact eg1, ground. Junctor JS is totally cleared since the last two relays which were operated (ce and cf) are now released.

At ep2, relay ep stops the pulse sent to distributor DI, which advance one step and comes thus in position 2.

Thus, after each call, the priority given to the different junctors JS is modified and the traffic is therefore shared fairly among these junctors.

At the exchange, the counting chain (FIG. 3b) assumes the last position (relay 8a' operated) when the seventh opening occurs. At 8a'2, relay 8a' completes the following circuit: battery, relay np (FIG. 3a, lower center) which operates, make contacts 8a'2, em'2 and ei'2, ground; at 8a'3, it releases definitely relays ea' and eb' (FIG. 3b).

Relay np completes itself a hold circuit at np24 (FIG. 3a); at np23, it completes itself a second hold circuit; battery, relay np, make contact np23, break contact nz2, ground. It completes at the same time a second hold circuit for receiving relay 7b: battery, relay 7b, make contacts 7b1, np24, np23, break contact nz2, ground; at np2, it grounds wire f5 extending to the equipment comprising the common thousand relays of line selection element; in order to inform said equipment that a call is waiting at the concentrator under consideration. At np25, relay np completes the two following circuits:

(1) Battery, relay 5c, break contact 5b2, make contact np25, ground;

(2) Battery, relay 6c, break contact 6b2, make contact np25, ground.

Wire p (FIG. 2) is grounded through break contact tv7 and one of the make contacts np3 . . . np6 in order to initiate, in the line selection element the different operations relating to the calling subscriber hunting.

There are 4 contacts np3 . . . np6 respectively connected to 4 different p wires; each p wire extends to a given portion of the call hunters, a portion being defined as a group of call hunters having access to the same outlets. Each of the contacts np3 . . . np6 is graded on two final selectors STc, because it has been assumed that each portion of call hunters has access to two final selectors STc in order to serve the given concentrator. The hunting for the calling subscriber, by the line selection element will not be described, this operation being not included in the invention.

Relay eg' (FIG. 3b, right), whose circuit has been broken at dp2 immediately before the reception of the identification code, restores after a given interval of time, but without further action.

During the reception of the identification code, relay em' has been submitted to brief short-circuits through break contacts 1a'2 and ea'3; but being slow-restoring because of these short-circuits, it remains operated. When the reception of the identification code is over, relay em' is short-circuited during a long interval of time through the break contacts mentioned and restores, which causes clearing out of send-receive device EC and junctor JC.

Relays df, de and ep' (FIG. 3a) restore, having their circuit opened by reopening of make contact em'1. Relay 8a' restores having its circuit opened at em'4 (FIG. 3b).

Thus, the circuit used for the transmission of the identification code from the concentrator to the exchange is cleared out, since both junctors JC and JS are cleared out. Send-receive device EC at the exchange restores; send-receive device ES at the concentrator remains seized for reasons which will be explained later. The calling subscriber's identification code remains stored on the marking relays MA (FIG. 3a).

At the exchange, the different operations relating to the calling subscriber hunting by the line selection element are carried on. One of the markers is chosen to handle the call and it will be assumed that it is the first marker. The following circuit is then completed: battery, resistance Re38 (FIG. 3a), break contacts 2b4 and 3b4, relay nc, wire f3 and ground in the marker. There are 4 relays nc respectively connected to the 4 outlet wires of pyramid PY1; each of them characterizes a group of 13 subscribers. In the example chosen, it is the first relay nc which will be operated, i.e. the one which is connected to the left hand side outlet wire of the pyramid. There are also 4 relays nc' respectively connected to the 4 outlet wires of a pyramid PY'1, similar to PY1, each of them characterizing a group of 13 subscribers, but these relays are connected to wires f'3 extending toward the second marker.

Relay nc comprises 13 make contacts nc1 . . . nc13 respectively connected to the 13 outlet wires of pyramid PY2. The grading arrow 4 indicates that each outlet wire is graded on 4 contacts associated with 4 different relays nc. Thus, for instance, the first outlet wire of pyramid PY2 is graded on the first contacts of the 4 relays nc; in the same way, the last outlet wire, of pyramid PY2 is graded on the last contacts of the 4 relays nc. Thus, there are at the outlets of contacts nc1 . . . nc13, 52 wires corresponding respectively to the 52 subscribers connected to the concentrator.

Wire m is then grounded through following circuit: ground, contacts of pyramid PY2, outlet wire (the first one in the example chosen, since it was assumed that the calling subscriber held the first rank in its group) contact nc associated with the first one of the 4 relays nc, break contact nt1, characterizing the calling subscriber, wire m. The calling subscriber is thus marked on the outlets of the final selector frame (FIG. 2).

When the marker is in operation, wire f6 is grounded and contact tn9 is closed; relay nz, delayed because of the short-circuiting of its left-hand winding, is finally operated. At nz1 (FIG. 3a, upper center), it completes the following circuit: ground, make contact nz1, and in all idle junctors JC, break contacts dt5 and dl4, right hand winding of relay dk, which operates, battery. Through its make-break contact nz2 (FIG. 3a, bottom), it substitutes for the initial hold circuit of relays 7b and np, the following hold circuit: ground on wire f6, make contact tn9, make contacts nz2, np23 and the circuit already mentioned.

When the calling subscriber hunting is over, the marker is cleared out, which causes restoring of the different relays of equipment MA. Relays 7b, np, nz restore, ground being removed from wire f6 by the marker. Relay nz is slow-restoring because of the short-circuiting of its left-hand winding, so that when the break contact nz2 is closed, relay np has surely restored.

Relay nc restores, the marker removing ground from wire f3. Relays 5c and 6c restore, having their circuit broken at np25.

At the same time, wire t extending from the call hunter CA (see FIGS. 1 and 2) is grounded, which causes the operation of relay dt (FIG. 3a) in junctor JC chosen by said hunter. In this same junctor, relay dk holds itself through following circuit: battery, left hand winding of relay *dk*, make contact *dk*2, rectifier R*d*35, and grounded wire *t*. Relays *dk* of the other junctors restore, having their circuit broken at *nz*1. The different equipments of FIGURES 2 to 5 are thus in the same respective positions as they were when junctor JC has been seized for a call towards a called subscriber at the concentrator, with only the following differences:

(1) Relay *dk* (FIG. 3*a*, top) operated in junctor JC;

(2) Relay *eh* (FIG. 4*a*, bottom) is operated in the send-receive device at the concentrator;

(3) Equipment MI (FIG. 5) of the concentrator is seized.

The operation is then the same as in the case of call from a subscriber at the exchange toward a called subscriber at the concentrator, with only the following differences. Line wires *a* and *b*, extending from the call hunter, are looped on resistance R*e*39 (FIG. 3*b*, top) through following circuit: make contact *dk*3, resistance R*e*39, make contact *de*4 and break contact *dc*5 in parallel. This loop keeps the exchange register (not shown) seized. After the identification code transmission and consequently the setting of the distant portion of final selector ST*s*, the line wires *a* and *b* extending from the primary stage (SP in FIG. 1) are looped on the calling subscriber.

At the concentrator, relay *eh* remains operated so as to open its break contact *eh*1 (FIG. 4*a*, bottom), preventing thus undesirable operation of relay *ef* through the contact *le*2 (FIG. 5). As soon as the send-receive device ES is seized, relay *eg* (FIG. 4*a*, left) is operated and opens at *eg*1 one of the two hold-circuits of relay *eh*.

When the distant portion ST*s* of the final selector is positioned on the calling subscriber, relay *lt* (FIG. 5) is operated through the contact *cv*4 and the contact *t* of the selector; break contacts *lt*1 and *lt*2 are opened, clearing out the identification matrix MI. Relays *lx*1, *ly*1 and *lz*1 restore, having their circuit opened at *lt*1 and *lt*2. The storage relays *la*1, *lb*1, and *lc*1 restore, having respectively their circuit opened at *lx*1/1, *ly*1/1 and *lz*1/1. Finally, relay *le* restores, having its circuit opened by restoration of make contact *lc*1/2. At *le*2, relay *le* opens the second hold circuit of relay *eh* which restores.

The calling subscriber is then connected to the call hunter of the exchange through the circuit shown in heavy lines and already described in the case of a call extended to the concentrator. It receives then from the register the dial tone signal to inform him to dial the called subscriber's number. The pulses sent by the dial are directly received by the register and the call is extended through the exchange, following a process which will not be described here, since it does not enter into the invention.

When the connection is established between calling and called subscribers, the metering pulses are received on a meter CR (FIG. 3*a*, top) assigned to the calling subscriber through contact *c* of final selector ST*c* and wire *c* of the call hunter.

The clearing out of the different equipments seized is accomplished as already mentioned in the case of a call extended towards the concentrator.

From the preceding descriptions, it follows that the extension of a call initiated by the concentrator comprises two distinct stages, during the first one, the identification code is transmitted from the concentrator to the exchange, in order to put the calling condition on the final selector outlets corresponding to the calling subscriber; during the second stage, which follows the setting of the final selector local portion, the identification code is transmitted from the exchange to the concentrator, in order to set the final selector distant portion on the same position as the portion located at the exchange. It will be noted that the link circuits used during these two stages are not necessarily the same. It will also be noted that during this second stage, the different relays are used again in the same conditions as for the extension of a call towards the concentrator, which allows a valuable saving of relays and decrease consequently the cost of the plant.

When a subscriber connected to the concentrator initiates a call, all necessary arrangements are provided to carry on completely the different operations, even if the said subscriber has stopped his call. In this latter case, relays *lx*, *ly* and *lz* (FIGS. 5 and 19) restore because of the opening of line wire loop, but the storage relays *la*1, *lb*1 and *lc*1 are kept operated, as mentioned. The identification code is transmitted to the exchange; the calling subscriber is marked on final selector outlets and the two selection stages of the exchange are positioned on the said subscriber; but when the connection is established, the exchange register does not find the loop through the line wires *a* and *b*. It initiates then the clearing out of the different equipments seized by removing the ground from wire *t*.

As already mentioned, the holding of the storage relays *la*, *lb* and *lc* of the identification matrix MI is secured until the complete storage of the code on the marking relays MA (FIG. 3*a*) located at the exchange. Faulty code transmission is thus prevented, in case the calling subscriber stops his call while another subscriber lifts his handset immediately after. When the identification code corresponding to a first calling subscriber is stored at the exchange and a second subscriber initiates a call, his coordinates are stored on the identification matrix MI, (FIG. 5), but this latter cannot seize a send-receive device ES of the concentrator, because relay *eh* (FIG. 4*a*, bottom) is operated and break contact *eh*1 is open. The second subscriber's call is handled only if the cycle of operations relating to the first subscriber is over.

It may happen that both junctors JC and JS send at the same moment a seizure signal. The seizure signal of one junctor cannot affect the other one and the dial tone is not received. As a matter of fact, the two send-receive devices located at the two distant terminals are in the "send" state; contacts *ef'*7 (FIG. 3*b*, upper center) and *ef*8 (FIG. 4*a*, upper center) are both in the make position. The two supply batteries oppose each other and neither of relays *ea* and *ea'* can operate. Relay *em'* (FIG. 3*b*, left) cannot operate and relay *ef'* is short-circuited through break contact *em'*1 and make contact *ep'*3.

At the concentrator, the operation is the same, relay *ef* (FIG. 4*a*, bottom) being short-circuited through break contact *em*1 and make contact *ep*4.

Relays *ef* and *ef'* are slow-restoring because of these short-circuits. One of them restores before the other. If it is relay *ef*, it initiates the clearing out of the concentrator, which can receive then correctly the seizure signal from the exchange. If it is relay *ef'* of the exchange which restores first, it initiates only partial clearing out of junctor JC; as a matter of fact, relays *dt* and *nt* (FIG. 3*a*, top) still hold, one through wire *t* grounded by the primary stage, and the other one through contact *tv*3 (FIG. 2). Under these circumstances, send-receive device EC is seized again because of the closing of make contact *dt*3, and again partial clearing out occurs if the seizure signal cannot be received by the concentrator, the operations progressing then in the same manner. Contact *ep'*1 (FIG. 3*b*, bottom) vibrates; condenser *cd*31 is in turn charged and discharged; but because of the presence of resistance R*e*30', the discharge is not completed during the closing of break contact *ep'*1. After several operations of relay *ep'*, *cd*31 finally charges; relay *mt* is operated and starts the trouble hunter, following a process already described.

In case the second marker is operated, to handle the call, wires *f'*3 and *f'*6 are used instead of wires *f*3 and *f*6 (FIG. 3*a*, bottom).

The exchange may serve several concentrators. There is one relay *np* (FIG. 3*a*, lower center) for each concentrator whose function is to ascertain the storage on equipment MA of a call initiated by said concentrator. Relap *np* for the first concentrator comprises contacts

*np*1/1 and *np*1/21; in the same way, relay *np* for the last concentrator comprises contacts *npm*/1 and *npm*/21, By means of these different contacts, a "more than one at the time" chain is formed, whose function is to ground wire *f7* in case at least two concentrators are simultaneously calling. Thus, for example, if there is call in the first and the last concentrator, wire *f7* is grounded through make contacts *npm*/21 and *np*1/1. The information thus given to the common thousand relay equipment allows this latter to initiate the simultaneous operation of the two markers in order to handle at the same time the two calls. In the contact chain mentioned in the preceding, contacts associated with the master relay of local fifties can be included so as to inform systematically the common thousand relay equipment of the presence of two simultaneous calls in two different fifties, be it local fifties or fifties connected to the concentrator.

A simplified junction diagram has been shown in FIG. 7, representing a totally exploded line selection element, the primary selection stage SP serving only subscribers connected to concentrators. The final selector frames comprise a local portion CT*c*, provided for marking and metering, and a distant portion CT*s* provided to extend the talking wires. Selectors of frame CT*c* have been represented, as an exception to the general rule, by light lines, being not employed for the talking path.

FIG. 8 shows a junction diagram of a line selection element, partially exploded. The primary selection stage has access, on some levels, to final selector frames CT*l* serving local subscribers AB/*l*; on other levels, it has access to final selector frames comprising a local portion CT*c* for marking and metering and a distant portion CT*s* to extend the talking path towards the subscribers AB of concentrator S. In this figure, marker M has been represented said marker controlling the operations of the different selection stages. As shown in FIGURES 7 and 8, the primary selection stage SP has access on some levels to overflow selectors SE, used to extend a call when there is no direct link between the fifty selector or the call hunter seized and a final selector liable to serve the marked subscriber. The operation of these selectors has already been described in prior patents, mentioned at the beginning of this description.

The telephone system, subject of the invention, is therefore very versatile, since it allows serving at will local fifties and/or distant fifties.

Referring now to FIGURE 9, a junction diagram will be described, in which the same final selector frame has access to two distant concentrators. Exchange C comprises a primary selection stage SP and a frame CT*c* having only the final selector local portion. As shown in the figure, the frame CT*c* has its horizontal grading cut in the middle and comprises two groups of final selectors, selectors ST*c* having access to the subscribers' meters CR of concentrator S and selector ST'*c* having access to the subscribers' meters CR' of concentrator S'. The distant portion ST*s* of the final selectors having access to subscribers AB, lies at concentrator S; in the same way, the distant portion ST'*s* of the final selectors having access to subscribers AB' lies at concentrator S'. This arrangement applies to low capacity concentrators and is of particular interest in the case of "rural zones."

It will be assumed that the final selector frame located at the exchange comprises 8 selectors, selectors 1 to 4 serving the first concentrator subscribers and selectors 5 to 8 serving the second concentrator subscribers. The primary selection stage has 4 portions, the first one serving final selectors 1 and 5; the second one, final selectors 2 and 6, the third one, final selectors 3 and 7, the fourth one, final selectors 4 and 8. It will also be assumed that the first concentrator subscribers are characterized by the third "0" code element and those of the second concentrator by the third "1" code element.

Referring to FIGS. 10*a* and *b*, circuit modifications are shown, which have to be effected in the final local and distant selector frames in case the same local frame is to have access to two different concentrators. In case of local subscribers, all final selectors of one frame have access to the same subscriber fifty, the primary selection stage being thus able to select any selector of the frame. In case of subscribers connected to distant concentrators, things are different; each concentrator is served only by part of the local frame selectors, and the primary stage should select a selector serving the wanted concentrator. Thus, arrangements must be provided in the final selector frame to detect the concentrator's identity and to put the calling condition on the primary stage outlets only on those selectors serving said concentrators.

In case of 24 line concentrators, low capacity multiswitches are used, comprising only 12 select magnets and 2 additional magnets, which are enough to perform a selection amongst 24 lines.

A final selector frame having access to two 24 line concentrators, serves thus $2\times24=48$ subscribers. These subscribers are divided into 4 groups of 12 subscribers. Each group is sub-divided into 2 groups of 6 subscribers each. Subscribers of groups 1 and 2 are assumed to be connected to the first concentrator; subscribers of groups 3 and 4 are assumed to be connected to the second concentrator.

Means are provided in equipment of FIGS. 10*a* and 10*b*, to store 3 distinct indications, the first one concerning the subscriber's group, the second one, his sub-group and the third one his rank inside the sub-group. Arrangements are provided to store only one call at a time.

Equipment of FIGS. 10*a* and *b* includes in FIG. 10*b* a set of 4 relays *ta* to receive the subscriber's group information, a set of 2 relays T*a*1, T*a*2 to receive the subgroup information and finally a set of select magnets 1H . . . 6H, 1B . . . 6B for the rank information. As soon as the group and the sub-group information is received, it is transferred to another set of relays which memorize it, keeping only one set of groups and subgroup information if several are received at the same time. 4 relays *tb* (FIG. 10*a*) are provided to register the group and two relays T*b*1 and T*b*2 for the sub-group. Subscribers of sub-group No. 1 correspond to the "high" select magnets, while those of sub-group No. 2 correspond to the "low" magnets. A set of relays *tf*1 and *tf*2 is provided to register the concentrator's identity, in order to put the calling condition in the primary stage outlets only on those final selectors which serve the wanted concentrator.

The relays whose designations are primed are used instead of those with corresponding but unprimed designations, when the second marker is operated.

When a subscriber connected to either of the two distant concentrators initiates a call and when his identification code has duly been stored at the exchange, relay *np* of FIGURE 3*a* is operated, as already mentioned, and contact *np*25 shown in FIG. 10*a* is closed. As an example it will be assumed that this subscriber is connected to concentrator No. 1, the third element of his identification code, which has been chosen to characterize the concentrator, being at "0"; relay 4*b* of FIG. 3*a* is at rest and break contact 4*b*8 (FIG. 10*b*) is closed. At the end of the code identification reception, contact *np*25 is closed, also; hence relay 4*c* is operated.

There are 4 wires *p* (middle of FIG. 10*b*) corresponding respectively to the 4 primary portions of line selection element, each wire being used to extend the call on a given portion. Wire *p* is connected, by means of contact 4*c*1, to contact *tv*7 of final selector No. 1 which has access to the first portion and serves the first concentrator. This wire *p* is also connected, by means of contact 4*b*3, to contact *tv*7 of final selector No. 5, which has access to the first portion and serves the second concentrator. The 3 other wires *p* are wired in the same way; the second wire *p* is connected to contacts *tv*7 of final selectors Nos. 2 and 6; the third wire *p* is connected to contacts *tv*7 of final selectors Nos. 3 and 7 and the fourth wire *p* is connected to contacts *tv*7 of final selectors Nos. 4 and 8. The table of FIGURE 13 gives all necessary information for correct wiring of the different wires *p*.

In the example chosen, it has been assumed that the calling subscriber was connected to the first concentrator; contacts 4*c*1 . . . 4*c*4 are closed; in each idle final selector serving said concentrator, contact *tv*7 is closed and wire *p* grounded. The call is thus extended to the corresponding primary portions. One of these is selected and is connected to either of the two markers of the line selection element. Let it be, for instance, the first marker.

The calling subscriber is then marked on the outlets of final selector frames of the line selection element, which is materialized by the grounding of wire *m*1 or *m*2 (top of FIG. 10*b*) and causes operation of a relay *ta*. There is one wire *m*1 or *m*2 for each subscriber and 4 relays *ta* in the final selector frame. The first relay *ta* corresponds to the first group of 12 subscribers of the first concentrator and is multipled on wires *m*1 Nos. 1 to 6 and wires *m*2 Nos. 1 to 6, whch allows one wire *m* for each subscriber. The second relay *ta* corresponds to the last 12 subscribers of the first concentrator, which form a second group and this second relay multipled on wires *m*1 Nos. 7 to 12 and on wires *m*2 Nos. 7 to 12. The third relay *ta* corresponds to the fisrt 12 subscribers of the second concentrator, forming a third group; it is multipled on wires *m*1 Nos. 13 to 18 and on wires *m*2 Nos. 13 to 18. Finally the fourth relay *ta* corresponds to the last 12 subscribers of the second concentrator, which form a fourth group; it is multipled on wires *m*1 Nos. 19 to 24 and wires *m*2 Nos. 19 to 24. Decoupling resistances Re101 and Re102 prevent interaction of the different marking wires through the common points. All these wires *m*1 and *m*2, as well as the 4 relays *ta*, are liable to be called into use when the first marker is operated. Wires *m'*1 and *m'*2 and relays *ta'*, arranged into a similar way are liable to be called in use when the second marker is operated.

In order to simplify the explanation, it will be assumed that the calling subscriber occupies rank No. 1 in the first group and thus is served by the first concentrator. Wire *m*1 No. 1 is grounded, and the first relay *ta* is operated.

Relay *ta* prepares at *ta*1 (FIG. 10*a*) the energizing circuit for relay *tb*. When the first marker is operated, there are 4 relays *tb* which are liable to operate, as indicated chart-wise below the typical circuit of *tb*, each one corresponding to one subscriber group and being in charge of registration of the call initiated by this group. The first relay *tb* is connected to contact *ta*1 of first relay *ta*; in the same way the fourth relay *tb* is connected to contact *ta*1 of the fourth relay *ta*. Arrangements are provided so that the different relays *tb* cut each other out, in order to register only one call from a group at the time, even if several relays *ta* are operated. Thus for instance, the first relay *tb* has its circuit cut by the 16th contact of relay *tb* No. 2 and by the first contact of relays *tb* Nos. 4 and 3.

When the second marker is operated, there are 4 relays *tb'* liable to operate, and which are arranged like relays *tb* previously mentioned. In order to avoid confusion, the numerical indications corresponding to relays *tb'* have been marked with a prime (1', 2', 3', 4').

The first relay *ta* completes, through its make contact *ta*1/2, the following circuit: ground, make contact *ta*1/2, break contact *tf*2/1, relay *tf*1 which operates, wire *f*8 and battery in marker No. 1. There are 2 relays *tf*/1 and *tf*2 liable to be used when the first marker is operated; relay *tf*1 is graded on the two contacts *ta*1/2 and *ta*2/2 and is operated in case a call is initiated by one of the first two subscriber groups, i.e. in case of a call initiated by the first concentrator; relay *tf*2 is graded on the two contacts *ta*3/2 and *ta*4/2 and is operated in case a call is initiated by one of the two last subscriber groups, i.e. in case of a call from the second concentrator. Relays *tf*1 and *tf*2 cut each other by means of the break contacts *tf*2/1 and *tf*1/1; thus, only the call of one concentrator can be registered.

When the second marker is operated, two relays *tf'*1 and *tf'*2 are provided, arranged in the same way as relays *tf*1 and *tf*2.

The final selector frame comprises a relay *tm* (FIG. 10*b*, middle) whose operation depends upon the chosen primary section and whose function is to initiate the hunting on said final selector outlets. This relay *tm* must operate only if the final selector serving the calling concentrator and having access to the primary portion chosen is idle. Thus, *tm* is graded, through decoupling resistances *Re*103, on the break contacts *tv*4 associated respectively to the 8 final selector of the frame, a closed contact *tv*4 characterizing an idle selector. Contact *tv*4 of selector No. 1 is connected, through contact *tf*1/6 characterizing concentrator No. 1, to a first wire *d* extending towards the first primary portion; contact *tv*4 of selector No. 5 is connected through contact *tf*2/6 characterizing concentrator No. 2, to the same wire *d*. Contacts *tv*4 of the other final selectors are connected in the same way to the wires *d* extending toward the other three primary portions. Table in FIG. 13 gives all necessary information for the wiring of these wires *d*.

A relay *tm'* has also been provided in the final selector frame, this relay having the same functions as relay *tm* and connected in the same way, and being operated when the second marker is used.

It will be assumed, for instance, that the primary portion No. 1 has been selected to handle the call and that selection No. 1 which has access to said portion and serving concentrator No. 1 is idle. Primary portion No. 1 having been selected, its wire *d* is grounded and following circuit is completed: ground, wire *d*, make contact *tf*1/6 (closed since the call is initiated by first concentrator) break contact *tv*4 of final selector No. 1 (closed if this selector is idle) resistance Re103, relay *tm* which operates, battery.

Relay *tm* being operated, the final selector frame is connected to the marker, and contact *tn*1 is closed. Following circuit is then completed (FIG. 10*a*): battery, relay *tb* and contact *ta*1 corresponding to the first subscriber group, break contacts *tb*16, *tb*1 and *tb*1 associated respectively to relays *tb* of the three other groups, make contact *tn*1, ground.

When relay *tb* operates, it registers the call of the first subscriber group. This relay comprises 12 contacts *tb*2 . . . *tb*7, *tb*8 . . . *tb*13 (FIG. 10*b*) which correspond respectively to the 12 subscribers of this group, each of these contacts being connected to the corresponding wire *m*. In the example chosen subscriber No. 1 of the first group initiates the call; wire *m*1 No. 1 is grounded and following circuit is completed: ground, wire *m*1 No. 1, make contact *tb*2, rectifier R*d*101, relay T*a*1 which operates, battery. At *th*15 (FIG. 10a), relay *tb* controls the operation of the additional magnet 7H.

A relay T*a*1 and a relay T*a*2 are provided, each of them characterizing a sub-group of 6 subscribers inside a group. Relay T*a*1 which corresponds to sub-group No. 1 in each group, is multipled on the 6 wires *f*9, which are respectively connected to the first 6 subscribers in each group.

Thus, for instance, the six wires *f*9 are connected to wires *m*1 Nos. 1 to 6 through the contacts *tb*2 . . . *tb*7 of relay *tb* characterizing the first group; in the same way, these same six wires *f*9 are also connected to wires *m*1 Nos. 19 to 24 through the contacts *tb*2 . . . *tb*7 of relay *tb* characterizing the fourth group. Relay T*a*2 characterizes the second six subscriber sub-group, inside each group, being wired in a similar way.

In the example chosen, relay $Ta1$ is operated, since the subscriber occupies rank 1 in the first group and belongs therefore to the first sub-group. At $Ta1/1$, relay $Ta1$ causes the operation of relay $Tb1$. A relay $Tb1$ and a relay $Tb2$ are provided, each one registering the call initiated by a sub-group inside a group. These two relays cut each other through their break contacts $Tb2/1$ and $Tb1/1$, allowing thus registering of a call for only one sub-group at a time. Relay $Tb1$ has 6 contacts $Tb1/2$ . . . $Tb1/7$ (FIG. 10b) respectively connected to the 6 wires $f9$ and extending to the first 6 subscribers in each group; in the same way, relay $Tb2$ has 6 contacts $Tb2/2$ . . . $Tb2/7$ respectively connected to the 6 wires $f10$ and extending to the last six subscribers in each group. The six contacts $Tb1/2$ . . . $Tb1/7$ are respectively connected to the six select magnets 1H . . . 6H; the six contacts $Tb2/2$ . . . $Tb2/7$ are respectively connected to the 6 select magnets 1B . . . 6B. In the example chosen, following circuit is completed: grounded wire $m1$ No. 1 corresponding to the calling subscriber, make contact $tb2/7$ associated with relay $tb$ of the first group, wire $f9$ No. 1, make contact $Tb1/2$, select magnet 1H which operates, battery.

The final selectors serving the first concentrator have access to 24 lines; the selection of one of them is accomplished by operating one select magnet chosen amongst 12 (1H . . . 6H, 1B . . . 6B) and either of the additional magnets (7H, 7B). The final selectors serving the second concentrator have also access to 24 lines; the selection of one of these is effected by the same magnets 1H . . . 6H, 1B . . . 6B, 7H, 7B. The select magnets 1H . . 6H, correspond respectively to the first 6 subscribers in each group; the select magnets 1B . . . 6B correspond respectively to the last 6 subscribers in each group. The additional magnet 7H, connected to contacts $tb15$ (FIG. 10a) of relays $tb$ Nos. 1 and 3 corresponds to subscribers' groups Nos. 1 and 3, i.e. to the first 12 subscribers in each concentrator, while additional magnet 7B, connected to contacts $tb15$ of relays $tb$ Nos. 2 and 4, corresponds to subscriber groups Nos. 2 and 4, i.e. to the last 12 subscribers in each concentrator.

The selection of the calling subscriber on the final selector outlets is ended. The additional magnet 7H indicates that said subscriber belongs to the first 12 group of his concentrator; the select magnet 1H indicates that he occupies No. 1 in this group.

As has been mentioned, primary portion No. 1 in SP of FIG. 9 has been chosen to handle the call; final selector No. 1 in STc having access to this portion and serving the first concentrator S in FIG. 9, is idle. Under these circumstances, break contact $tv4$ of said selector is closed and wire $mp$ (FIG. 10b, middle) is grounded through following circuit: wire $d$, grounded by the primary portion No. 1, make contact $tf1/6$ (closed, since the call is initiated by the first concentrator) break contact $tv4$ of final selector No. 1, wire $mp$ associated with said selector, Wire $mp$ being grounded, final selector No. 1 is in the calling condition on the primary portion call hunter outlets.

When the two selections are accomplished, i.e. selection of final selector and that of the calling subscriber, the connection is established through the call hunter and the final selector.

In a general way, the selection of a calling subscriber is effected in 3 stages:

(1) Selection of a 12 subscriber group amongst 4 groups (relay $tb$, additional magnet 7H or 7B); determination of the calling concentrator (relay $tf1$ or $tf2$);

(2) Selection of a 6 subscriber sub-group inside a group previously selected (relay $Tb1$ or $Tb2$);

(3) Selection of the subscriber inside the sub-group previously selected (select magnets 1H . . . 6H; 1B . . . 6B).

At each stage, arrangements are provided so as to select only one group, sub-group or subscriber. Relays $tb$ cut each other so as to register only the call of one group; the same goes for relay $Tb1$ and $Tb2$ when selecting a sub-group; finally, known means, not represented allow operation of only one select magnet 1H . . . 6H, 1B . . . 6B at a time.

When the final selector is connected to the calling subscriber, the marking ground is removed from wire $m1$, which initiates the clearing out of equipment of FIGS. 10a and b, relays $ta$, $Ta1$ and magnet 6H are restored, having their energizing circuit opened on wire $m1$. Relay $ta$ opens at $ta1$ the circuit of relay $tb$ and at $ta1/2$ that of relay $tf1$. Relay $Ta1$ opens at $Ta1/1$ the circuit of relay $Tb1$. Relay $tb$ opens at $tb15$ the circuit of the additional magnet 7H. Relay $tm$ restores, having its circuit opened at $tv4$ when the final selector is connected. Finally, relay $4c$ restores, contact $np25$ being opened when the marker is cleared out, as mentioned in the description of FIG. 3.

The table of FIG. 12, which gives all necessary wiring instructions to connect the code reading wires B′ . . . H′, is an alternative way with respect to that of FIG. 6 in case the final selector frame has access to two different concentrators. If the table of FIG. 12 is compared to that of FIG. 6, it appears that for the first concentrator, the connections of the different wires B′ . . . G′ are the same, with the only difference that the two additional magnets 7H and 7B are used instead of the two additional magnets 14H and 14B. The identification codes used for the 24 subscribers of concentrator No. 1 are the same as for the 24 subscribers of a 52 direction concentrator served by select magnets 1H . . . 6B. Regarding the second concentrator, the connection of the different wires B′ . . . G′ are the same, with the difference that the select magnets 8H . . . 13B in FIG. 6 are replaced by select magnets 1H . . . 6B in FIG. 12, and that the additional magnets 14H and 14B are replaced by additional magnets 7H and 7B. The identification codes used for the 24 subscribers of concentrator No 2 are the same as for the 24 subscribers of a 52 direction concentrator served by the select magnets 8H . . . 13B. Thus, different identification codes are used for each of the two concentrators, which allows the exchange to recognize a subscriber without any hesitation.

It appears from table of FIG. 12, that for the first concentrator, wire D′ is never connected. The third code element is thus always a "0," as mentioned. However, for the second concentrator, one of the wires D′ and H′ is always connected, the third code element being a "1."

In case the calling subscriber is connected to the second concentrator, the third code element which is received is a "1," relay $4b$ of group $2b$–$7b$ in FIG. 3a is operated and contact $4b8$ (FIG. 10b) is opened. Closing of contact $np25$ hence does not affect relay $4c$. In each idle selector 5 to 8 serving the second concentrator, contact $tv7$ is closed, and the following circuit is completed: ground, break contact $tv7$, one of the make contacts $4b3$ . . . $4b6$ (closed since the third code element received is a "1"), wire $p$. The grounding of wire $p$ causes the extension of the call to the corresponding primary portion. Then, the different operations are carried on as in the case of a call initiated by the first concentrator, with the difference that a relay $ta$ and a relay tb are operated, corresponding to the third or fourth subscriber group. Relay $tf2$ is operated instead of $tf1$, said relay connecting through its different contacts $tf2/6$ . . . $tf2/9$ wire $d$ with the different break contacts $tv4$ of final selectors 5 to 8.

In case the primary portion liable to handle the call has not direct access to the final selector serving the wanted concentrator, the call cannot be extended by the process described previously. If, for instance, primary portion No. 1 is the only one which can handle the call, because it is the only one amongst the 4 portions to have an idle call hunter which has access to an idle register, wire *d* is grounded; but if selector No. 1 which is the only one giving access to said primary portion and serving the calling concentrator No. 1, is busy, its contact *tv4* is opened, relay *tm* cannot operate and it becomes necessary to call in the overflow. For this purpose, there are provided 4 wires *e*, when first marker is operated, one wire for each primary portion, connected in the same manner as wires *d*. The table of FIG. 13 gives all necessary instructions to carry out the wiring. Wires *e'* are used when the second marker is operated. Wires *e* and *e'* are used to extend the call to a primary portion which will assume the function of an overflow portion, in case the call has not been able to be handled following the normal process, after a given time has elapsed. Thus, for instance, if final selector No. 2 serving the calling concentrator No. 1 is idle, its break contact *tv2* is closed and wire *e* of the second primary portion is grounded through contacts *tf1/3* and *tv2*. The grounding of wire *e* causes the call to be extended to this second portion, which is selected as overflow portion, after the given time mentioned. Said portion grounds then its wire *d*, relay *tm* is operated and the hunting operations in the final selector frame are carried on as already mentioned.

The extension of a call towards a called subscriber of one of the two concentrators is similar to the extension of a call towards the exchange. Only in this case, contact *np25* remains at rest; wire *p* remains unemployed. The marker receives the part of the called subscriber characterizing his position in the line selection element and grounds corresponding wire *m1* or *m2*.

Sometimes, it becomes necessary to establish the connection with a subscriber's line, whether this line is idle or busy. This is the case, for instance when the operator wants to overhear the communication or to proceed to a line test. In this case, the process explained in the foregoing descriptions is no longer valid. As a matter of fact, when a subscriber is busy, relay *nt* (FIG. 3*a*) corresponding to said subscriber is operated through contact *t* of final selector ST*c* (FIG. 2) and the make contact *tv3* of said selector hold magnet, said relay preventing through its two break contacts *nt1* and *nt2* the marking on the final selector outlets. Special arrangements are then provided for this kind of call. When an operator wants to reach a subscriber's line, be it busy or idle, he uses a special register, called test register. It will be assumed, for instance, that the called subscriber occupies rank No. 1 in the first group; thus, he is connected to the first concentrator.

In order to establish the call towards the called subscriber, the operator has at his disposal wires *f11*, *f12*, *f13*, *f14* (FIGS. 10*a* and *b*) which are connected to the specialized register and allow him to operate directly one of the select magnets 1H . . . 6B and one of the additional magnets 7H, 7B. There are 12 wires *f11* connected respectively to the 12 select magnets EH . . . 6B through make contacts *tz1/2* . . . *tz1/13*; likewise, there are 12 wires *f12* connected respectively to the 12 select magnets 1H . . . 6B through make contacts *tz2/2* . . . *tz2/13*. Wires *f11* are used when the operator wishes to call a subscriber from concentrator No. 1 and all of them are connected, through decoupling resistances Re103, to a relay Tz1. Wires *f12* are used when the operator wishes to call a subscriber of concentrator No. 2, and all of them are connected, through decoupling resistances Re104, to a relay Tz2. In the chosen example, the subscriber occupies rank No. 1 in the first group and corresponds thus to select magnet 1H and additional magnet 7H. Wire *f11* No. 1 is grounded and relay Tz1 is operated. Through its make contact Tz1/1, relay Tz1 completes the circuit of relay *tz1*, which is operated in its turn.

Relay *tz1* completes at *tz1/1* the following circuit: wire *f9* grounded by the marker, make contact *tz1/1*, break contact *tf2/1*, relay *tf1*, wire *f8* and battery in the marker; at *tz1/2*, it completes the following circuit: grounded wire *f11*, make contact *tz1/2*, select magnet 1H, battery.

There are 2 wires *f13* and 2 wires *f14*. Wires *f13* are used for calls towards concentrator No. 1 and are respectively connected to the additional magnets 7H and 7B through make contacts *tz1/14* and *tz1/15*. Wires *f14* are used for calls toward concentrator No. 2 and are respectively connected to the additional magnets 7H and 7B through make contacts *tz2/14* and *tz2/15*. In the example chosen, the call is extended towards concentrator No. 1 and the called subscriber belongs to the first group; following circuit is then completed: wire *f13*, grounded by the test register, make contact *tz1/14*, additional magnet 7H, battery.

Operation of relay *tf1* indicates that the call has to be extended toward the first concentrator. Through its different make contacts *tf1/6* . . . *tf1/9*, it connects wires *d* of the 4 primary portions to break contacts *tv4* of final selectors having access to said portions, which initiates the different operations already described; through its make contacts *tf1/2* . . . *tf1/5*, it extends the call towards one or several overflow portions, if necessary.

Combination of select magnet 1H and additional magnet 7H characterizes the subscriber occupying rank No. 1 in the first group.

Thus, the selection of the called subscriber has been effected, whatever the condition of this line may be.

When the connection between the operator and the called subscriber is established, equipment of FIGS. 10*a* and *b* is cleared out in the following way. Relay *tz1*, select magnet 1H and additional magnet 7H restore, following the removal of ground from wires *f11* and *f13*. Relay Tz1 opens at Tz1/1 the circuit of relay *tz1*, which restores in its turn. Finally relay *tf1* restores, having its circuit opened at *tz1/1*.

A call towards a subscriber connected to concentrator No. 2 is extended in a similar way, with the only difference that relays Tz2, *tz2* and *tf2* are used.

Referring now to FIG. 14, it will be explained how the connection between a less loaded final selector frame and other frames of the same line selection element is effected.

In general, in a given line selection element the traffic can be balanced by line permutations on the different fifties, which allows to foreseeing the same number of selectors in the different final selector frames. However this is not always possible, specially when the line selection element is exploded. The case may arise where there is a partially exploded line selection element in which the local final selectors have to handle a more important traffic than the distant final selectors which may serve remote spots or residential districts.

When the number of distant fifties is sufficient, a special line selection element can be provided, based on a low traffic; this solution is better than the distribution of distant final selector groups in all line selection elements. But this is not possible when the exchange has only a few distant groups.

FIG. 14 shows the arrangements to overcome this difficulty. A final selector frame less loaded than other frames of the same line selection element has final selectors, such as ST, which are connected to two different primary portions, As to said final selector ST and the associated control relays, only the elements of circuit necessary to the understanding of the invention have been shown. The final selector is multipled on two positions belonging to two different primary portions. This arrangement is similar to the well known "grading," but it will be noted that only the line wires *a*, *b*, *c*, *t*, i.e. those extending through the different selection stages are graded; control wires *d*, *d'*, *e*, *e'*, *p* on the contrary are not graded. With regard to the arrangement of the different circuits, everything takes place as if there were two different final selectors; however hold magnet TV of selector No. 2 is replaced by a relay *tv'* having the same contacts as the hold magnet to which it is substituted.

The operation is as follows. When the final selector ST is idle, hold magnet TV as well as relays *tv'*, *tm* and *tm'* are at rest. When a subscriber, served by the given final selector frame, initiates a call, contacts *lp3* and *lp4* of a master relay are closed, which causes the grounding of wires *p* extending to the two primary portions. One of these, for instance primary portion No. 1, is selected and connects itself to one of the two markers, for instance marker No. 1. This marker puts the calling condition on the subscriber's position on the final selector outlets, which causes the closing of contact *tf9* connected to wire *d* extending to the primary portion No. 1. This latter, chosen to handle the call, grounds wire *d*, following circuit being then completed: wire *d*, make contact *tf9*, break contact TV5, resistance Re141, relay *tm*; battery. In the final selector frame, there is only one relay *tm* graded through the decoupling resistances Re141 on the contacts TV5 of all final selectors of the frame. Wire *d* is graded, through contact *tf9*, on two break contacts TV5, because it has been assumed that the primary portion No. 1 had access to two final selectors in the given frame.

Operation of relay *tm* controls the different operations relating to the hunting of the calling subscriber on the final selector outlets and causes by any suitable means the closing of make contacts *tq1* . . . *tq8* The ground used to energize relay *tm* is then extended on wires *m* of the idle selectors, which are then in the calling condition on the primary portion outlets.

When the two selectors are positioned, in the primary portion as well as in the final selector frame; said primary portion causes the grounding of wire *t* and hold magnet TV is operated. Said hold magnet controls the closing of its different make contacts *a, b, c, t,* so as to connect the primary portion to the calling subscriber; through the operation of its two contacts TV1 and TV3, it substitutes to its initial energizing circuit, following hold circuit: battery, windings in series of magnet TV, make contact TV1 and wire *t* grounded by the primary portion; at TV5 and TV7 it breaks both control wires *d* and *p*. Relay *tv'* is operated in parallel with hold magnet TV and breaks both control wires *d* and *p* extending to primary portion No. 2, which have not been used in the example chosen. The different common control equipments used to extend the call are cleared out.

The different line wires *a, b, c, t* are extended through the final selector ST. Wires *a* and *b* are used for the talking path; wire *c* for the metering; wire *t* for the holding of the connection and the energizing of the subscriber's cut-off relay.

At the end of the call, the clearing out is controlled by an equipment not shown, which removes the ground from wire *t*. Hold magnet TV restores, and opens its different contacts *a, b, c, t*.

As mentioned, the call has been extended to the two primary portions Nos. 1 and 2 by means of the corresponding wires *p*. It will now be assumed that primary portion No. 2 has been selected to handle the call. The operation is similar to the foregoing case, with the difference that wires *p, d* and *m* are now used, said wires extending to primary section No. 2. When the two selections are over, in the primary portion as well as in the final selector frame, said primary portion causes the grounding of wire *t*, which energizes in parallel hold magnet TV and relay *tv'*. Primary portion No. 2 is then connected to the calling subscriber through wires *a, b, t, c* and the corresponding contacts of final selector ST.

From the foregoing description, it appears that during the selection stage, the operations are carried out as if there were two different final selectors, since there are two different control wire sets, however, at the instant when connection occurs, only one selector is used.

In case of a call towards a called subscriber, wire *p* is not used, since there is no call to be extended towards the primary portion.

Wires *e* leading to said primary portions are used to extend the call towards said portions when the latter are used for the overflow. Finally, wires *d'* and *e'* have the same functions as wires *d* and *e*, in case the second marker is operated.

Control wires *d, d', e, e', p* are not graded for the following reason. The frame may comprise a number of final selectors having access to two primary portions (common) and other selectors having access to one primary portion (individual). If wire *p*, for instance, was multipled a final selector having access to the first primary portion only would be erronenously in the calling condition on the two primary portions.

In the foregoing description, it has been assumed that the same final selector ST was graded on two different primary portions. There is no objection in multipling a final selector on 3 or even 4 primary portions. In the lower part of FIG. 14, several examples of this type of multipling have been shown. In the first one, the frame has been designed for 12 final selectors arranged in two columns of 6 selectors each. The location of each selector has been represented schematically by a small circle. If only 8 selectors have to be used in this frame instead of 12, it is possible to gather, as shown, the 3 final selector into one single selector which should be located in the upper part of the right hand column, and grade the selector thus formed on 3 different primary portions. The same goes for the 3 selectors corresponding to the lower part of the right hand column. Finally 8 selectors only remain in the frame, 6 in the left hand column and only two in the right hand column.

The second grading example corresponds to a frame which has been designed for 10 final selectors but has been equipped with only 8 selectors. The third example corresponds to a frame designed for 16 selectors and equipped with only 8 selectors. Finally the fourth example corresponds to a frame designed for 14 final selectors but equipped with only 8 selectors.

It is understood that the final selectors multipled on a number of primary portions or "common" have to be taken in the last place i.e. after those which are not graded, or "individual," following a well-known principle in automatic switching. In order to achieve this, a suitable wiring order has to be chosen to connect the final selectors to the primary portion outlets. Thus, for instance, if a primary portion has access to two final selectors to serve a given subscriber fifty, let it be an "individual" selector A and a "common" selector B, and if the contact chains are arranged so as to give systematically select magnet 1B of the primary portion the preference on magnet 2B, magnet 1B will be assigned to the "individual" selector and magnet 2B to the common selector.

Now it will be explained, referring to FIG. 15, how concentrators of the type this invention deals with, can be included in an automatic step by step telephone system, using rotary commutators. In order to realize the hunting of a calling subscriber ABr6, i.e. to connect him with a supply device ALr6 and from there with a register EN, a hunter CH and a preselector PR are employed. To realize the selection of a called subscriber, 4 successive selection stages, are provided, a primary selector PS, a selector of thousands SM, a selector of hundreds SC and a connector of final selector CN. These different selectors are controlled respectively by register EN, setter ORSM, setter ORSC and setter ORNC. The function of the supply device ALr6 is to send a ringing current to the called subscriber, to await his answering and to keep the different apparatus, used in establishing the communication in position.

C represents an exploded line selection element and S a concentrator, similar to those of FIG. 7, with the only difference that two devices, a testing device TE and a setter OR has been added to the line selection element C. The testing device has to indicate the call hunter which has to be used to serve a subscriber of the concentrator; setter OR receive the last three figures of a called subscriber, codes them and transmits them to the marker. Each of the call hunters CA of this line selection element is connected with a supply device AL*r*6; the selectors of fifties SC are connected with different positions corresponding to the same level of the selector of thousands SM.

The operation is as follows. When a subscriber connected to the concentrator, initiates a call, a testing device TE comes into action and indicates an idle call hunter CA, associated with a supply device AL*r*6, which in its turn has access to an idle register. This testing device now causes the starting of the marker which controls the establishment of a connection between the selected call hunter and the corresponding position of the calling subscriber. The distant part ST*s* of the final selector in concentrator S is set on the same position as the local part ST*c*, i.e. on the calling subscriber AB. Now marker M and testing device TE are cleared out and the calling subscriber AB is connected with register EN by the following circuit: subscriber AB, distant part ST*s* of final selector, call hunter CA, supply device AL*r*6, register EN. The calling subscriber now receives from this register a dial tone signal, asking him to dial the number of the called subscriber. Register EN receives this number, translates it, controls the setting of primary selector PS and sends successively the thousands digit, the hundreds digit and the last two digits of the number to setters ORSM, ORSC, and ORCN. Selectors SM, SC and CN are set, one after the other on the called subscriber AB*r*6. Now register and setter are cleared out and supply device AL*r*6 sends a ringing current to the called subscriber. When the latter answers, the communication between calling and called subscriber is established.

When a subscriber AB*r*6 initiates a call, he is connected by the different stages of preselection CH and PR with supply device AL*r*6 which is associated to register EN. In the same way as in the preceding example, register EN receives the dialed number and controls the setting of the first two stages PS and SM.

Supposing that the dialed number corresponds to a subscriber connected with the concentrator, the selector of thousands SM is set on an idle selector of fifties SC associated with a setter OR, also idle. The last three figures of the called subscriber are received and coded by setter OR and afterwards transmitted to one of the two markers of the line selection element. After having accomplished their respective functions, register EN and setter ORSM are cleared out. The hunting of the called subscriber now is realised in a way alread described. The communication between the two subscribers is maintained through following circuit: subscriber AB*r*6, hunter CH, preselector PR, supply device AL*r*6, primary selector PS, selector of thousands SM, selector of fifties SC, distant part ST*s* of final selector, called subscriber AB.

All possibilities relative to the distribution of lines and PBX groups (lines assembled under the same number) have been provided for all subscribers served by the line selection element.

The invention has a particular value for rural areas, where most often telephone density is rather low.

In fact, as soon as the line selection is exploded, the exchange can be given a quite different meaning from the usual one. It can be imagined indeed to explode the line selection completely, so that the exchange only serves the concentrators. Its position is no more determined by a fixed network but by an assembly of small networks, said exchange lying at their centre of gravity, perhaps outside, of all built up areas when such a position would be justified. In this way, the most suitable location can be found in order to obtain a reasonable mean attenuation, to maintain a sufficient microphone supply and to realise a maximum of saving in the network.

As appears from the foregoing description, the equipment to be installed in the concentrators is very simple and no supply unit has to be incorporated, all supply being provided by the exchange. However, if a concentrator is at a very great distance from the exchange, the resistance of the junction lines might be too high to secure a correct operation of a subscriber's set. FIGURE 16 indicates an interesting arrangement to prevent this drawback. In central C a normal supply battery is connected by means of supply relay *aa* to conductor *a* and *b* of each feeder. The minus of this battery being connected with *a*, the plus with *b*. In each junction circuit in concentrator S a booster battery BS is provided, the terminals of which are connected with a capacity C. The plus of this booster battery is connected with conductor *a* coming from exchange, the minus with conductor *a* extending to the subscriber. When the selection of a called subscriber AB is terminated and when said subscriber is connected with the supply device in exchange C, the ringing current provided by this supply device flows through capacity C, which has to be chosen so as not to obstruct the passage of this current. When the called subscriber answers, he is supplied by the following circuit: minus of battery BC, left hand winding of supply relay *aa*, conductor *a*, booster battery BS, subscriber AB, contacts of final selector ST*s*, conductor *b*, left hand winding of supply relay *aa*, ground.

In practice, a battery of 24 volts will secure a suitable microphone supply for circuits having a total loop resistance of about 2000 ohms, which covers practically the most difficult cases.

FIGURE 17 represents the wiring diagram of the device of FIGURE 16. The essential part of the booster device located at the concentrator is transformer T*r*, the primary winding of which is connected to the net supply by the contact *ca*1 which is only closed when the junction lines between exchange and concentrator are in operation. The voltage at the secondary of this transformer is rectified by a bridge of rectifiers R*d*54 and filtered by choke S*e* and capacity C*d*51. This voltage is applied to the terminal of resistance R*e*52 by the break contacts *cb*1 and *cb*2 of relay *cb*. This relay *cb* is connected in series with line conductor *a* and polarized by rectifier R*d*55 and detects the reversal of the battery which might be produced at calling subscriber's side when the called subscriber answers, and, consequently, inverts the polarity of the booster device. Transformer T*r* is provided with a screen which has to be grounded in order to fix the value of the capacity introduced in parallel with the upper line conductor. The characteristics of the transformer are such, that practically no unbalance on the lines will result from the presence of the booster device; however, if it is desired to perfect the balancing, a small capacity C*d*53 can be employed, which is connected across conductor *b* and ground as shown by the dotted circuitry. If a concentrator is at a great distance from the exchange, a repeater RP with a negative impedance can be employed which secures a suitable transmission level, without restricting the passage of the D.C. supply current. Finally a capacity C*d*52 is provided across relay *cb* for the talking currents.

When the called subscriber is connected with the exchange by contacts *a* and *b* of the final selector, contact *ca*1 will be closed by any suitable means in order to start operation of the booster device. A voltage is applied across the terminals of resistance R*e*52 and is added to the supply voltage of the battery in the exchange. The ringing current flows from the exchange by shunt connected capacity C*d*52 and relay *cb* to the called subscriber. Relay *cb* is designed, so that it will not be affected by the A.C. ringing current. When called subscriber answers, his line conductors are mechanically short circuited, causing operation of ringing current cut off relay in the exchange. Of course this relay is supplied in such a manner that the booster current is added to the current supplied by the normal battery in the exchange. The microphone supply circuit is closed by rectifier Rd55, relay *cb* is not operated so the booster voltage is suitably applied by breaks contacts *cb*1 and *cb*2.

If a call is initiated by the concentrator, calling subscriber is supplied from the central office as soon as contacts *a* and *b* of the final selector are closed. The microphone supply circuit is closed by rectifier Rd55, relay *cb* is not operated, securing by its break contacts *cb*1 and *cb*2 the connection of the booster device in the wanted direction. When a subscriber initiates a call, he causes, by means of his dial, breakings of the line, that in no way influence relay *cb*. When the selection is terminated, the return ringing current is transmitted to calling subscriber by capacity Cd52 shunted by relay *cb*. Finally, when called subscriber answers, the direction of the supply current provided by the exchange is inverted; rectifier Rd55 is non-conducting and relay *cb* is operated, reversing, by means of its contacts *cb*1 and *cb*2 the polarity of the booster device. Consequently, the energizing current of relay *cb* equals the difference of the current supplied by the battery in the exchange and the current provided by the booster device. The characteristics of relay *cb* have to be chosen to secure a good operation under these circumstances.

The supply rectifier of the above described arrangement has to be chosen so as to maintain a voltage across resistance Re52 which does not vary considerably during the inversion of the battery, occurring when the called subscriber answers. If this voltage would increase, the exciting current for relay *cb* might be insuffiicent. FIGURE 18 shows an alternative embodiment permitting, by means of the addition of a stabilizing device, the use of a less expensive rectifier. The filter is formed by resistances Re104 and Re105, and capacities Cd57 and Cd58. The stabilising device is made up of two Zener diodes connected in opposition as shown in the figure. The characteristic of these diodes is, that when they are used in the non-conducting direction and operate in a well chosen part of their characteristic, the voltage across their terminals is practically constant, even when the current flowing through these diodes varies to a great extent. At the instant of the battery inversion, caused by the answering of called subscriber, the current provided by the booster device may vary, but the voltage across Pt1 and Pt2 remains practically constant. In this way, a proper operation of relay *cb* will be secured, without the use of a large and expensive rectifier filtering device as in FIG. 17. To obtain a good operation, it will be necessary that one of the two diodes Di1 and Di2 always operate in the non-conducting direction; that is why they are in opposition. When one of the diodes is in operation, i.e. when a back current flows through one of them, the other behaves like a low value resistance and has practically no influence on the total operation.

Resistances Re53 and Re54, connected respectively across make contact terminals of *cb*1 and *cb*2, have been provided for following reason: as soon as relay *cb* begins to attract the armature, break contacts *cb*1 and *cb*2 are opened; the current supplied by rectifier Rd54 is looped on resistances Re53 and Re54 through diodes Di1 and Di2. A given voltage immediately appears across Pt1 and Pt2 so as to be added to the voltage supplied by the battery in the exchange. Relay *cb* will quickly be operated. As soon as make contacts *cb*1 and *cb*2 are closed, resistances Re53 and Re54 are short-circuited, but the voltage across Pt1 and Pt2 is maintained at the same level, described herefore, by diodes Di1 and Di2.

It is understood that the preceding descriptions are only given as examples and that many modifications can be applied without leaving the scope of the invention. In general, this invention can be applied to telephone systems using cross bar switches as well as all other systems using concentrators of small capacity. Other coding systems could be used. Particularly, all numerical indications, depending mostly on operation data and are liable to vary with each office, have only be given by way of example in order to facilitate the understanding of the operation and could be modified without changing the characteristics of the invention.

What is claimed is:

1. A telephone switching system comprising an exchange, a plurality of distant concentrators, each concentrator comprising a final selector having a local part located at said exchange and a distant part including the talking wires located at a distant point, said local part including all the elements of a final selector except said talking wires, means located at said distant part for transmitting the identity of a calling line to said exchange and to mark the position of said line on the outlets of said final selector local part, and means for transmitting from said exchange to said final selector distant part signals relative to the position of said final selector local part, and means responsive to said signals for setting said final selector distant part on a position similar to the position of said local part.

2. A telephone switching system as defined in claim 1, further comprising a first send-receive device at the exchange, means responsive to the setting of the local part of the concentrator on a position corresponding to a called line at said concentrator for operating said send-receive device for causing it to send signals representing the position information of said local part, a second send-receive device at the concentrator for receiving said signals, and means controlled by said second send-receive device, in response to said signals for controlling the setting of the final selector distant part on the position of the called line.

3. A telephone switching system, as defined in claim 2, further comprising means for operatively connecting the send-receive devices at the exchange and at the concentrator only during the time the said signals representing the position information of the said local part, and the said signals for controlling the final selector setting are sent.

4. A telephone switching system, as defined in claim 3, in which the means for operatively connecting the send-receive devices comprises marking equipment for storing the identification of a calling line in the case of a call initiated by a line at the concentrator, whereby the send-receive device at the exchange may be quickly cleared.

5. A telephone switching system, as defined in claim 1, in which the means for transmitting the identity of a calling line comprises line identifying means at the concentrator, and means for causing the send-receive device at the concentrator under control of said line identifying means to send signals to the send-receive device at the exchange characterizing said calling line.

6. A telephone switching system, as defined in claim 5, further comprising means responsive to the receipt by the exchange of signals identifying the calling line at the concentrator for maintaining the send-receive devices busy as long as the given call has not been extended.

7. A telephone switching system, as defined in claim 5, in which the means for transmitting signals from the concentrator to the exchange and from the exchange to the concentrator comprises a plurality of junction circuits, a distributor at the concentrator, means for causing said distributor to choose a junction circuit and to connect the calling line to the exchange over said junction circuit for transmission of signals from the concentrator to the exchange, and means at the exchange to cause a selector to choose a second junction circuit and to connect said exchange over said second junction circuit for transmission of signals from said exchange to said concentrator.

8. A telephone switching system, as defined in claim 7, further comprising means at the junction circuits for sending a seizure signal, and means responsive to the failure thereafter to receive a dial tone signal to initiate the sending of the identifying code for clearing the associated equipment, means for seizing another junction circuit in case the call is initiated by the concentrator, and means for indicating a fault in case the call is initiated by the exchange.

9. A telephone switching system, as defined in claim 8, further comprising means responsive to the simultaneous sending of a seizure signal by the exchange and the concentrator for preventing the operation of any send-receive device and the sending of the dial tone signal to the exchange or to the concentrator, and for initiating the different clearing operations, one of the junction circuits being cleared first.

10. A telephone switching system, as defined in claim 1, further comprising means responsive to the final selector local and distant parts having been set on a particular position for connecting the line corresponding to the position to the exchange, and means for sending supply current from said exchange to said line of a type which permits the selection of a substation among several on a party line.

11. A telephone switching system, as defined in claim 1, further comprising means for maintaining the line wires at the exchange looped to keep the selection stages seized during the time which elapses between the setting of the final selector local and distant parts, whereby, if the calling line does not carry on with the call, the line wires are opened after the setting of the final selector part, and means for clearing the seized apparatus upon the opening of the line wires.

12. A telephone switching system, as defined in claim 11, in which the means for clearing the seized apparatus comprises means for sending a clearing signal from the exchange to the concentrator, an electronic tube at the concentrator for receiving said signal and delay means for delaying the operation of said tube for a predetermined time so that undesirable clearing is avoided.

13. A telephone switching system, as defined in claim 1, in which a plurality of final selectors are mounted in one frame and serve two or more different concentrators, said system further comprising means for allotting one or more final selectors to each concentrator, means responsive to the initiation of a call from a concentrator for analyzing the calling line identification information and deducing the identity of the concentrator to which the calling line is connected, and means controlled by said last-mentioned means for putting only those final selectors in the calling condition on local part outlets which serve said concentrator.

14. A telephone switching system, as defined in claim 13, in which certain selectors of the frame have access to local lines only, further comprising means for grading a final selector on the outlets of a plurality of common portions to the line wire only, the controlling wires provided to extend the call to the common portions remaining individual to each portion and being broken by contacts controlled by the final selector hold magnet, whereby the same set of control wires may be used for all the selectors of the frame, common or individual.

15. A telephone switching system, as defined in claim 1, in which the exchange is a step-by-step exchange and the last selection stage comprises a line selection element, a test device connected therewith and a setting device connected therewith, a plurality of call hunters, means for operating said test device in response to a call initiated by the concentrator for selecting a call hunter, means for operating said setting device in response to a call to the concentrator to receive the signals representing the number in the form of numerical pulses and to retransmit said signals to the marking means in coded form.

16. A telephone switching system, as defined in claim 1, further comprising a booster voltage source at the concentrator, normally poled the same as the microphone supply voltage at the exchange, a detecting device connected to the line for detecting the reversal of the microphone supply current when the called party answers, and means responsive to the operation of said detecting device for reversing the direction of the current from said booster source so as to be in series with the exchange supply.

17. A telephone switching system, as defined in claim 16, further comprising a non-linear element in series with one of the line wires, the booster voltage being connected across said element, whereby at the reversal of current caused by the called party's answer, the voltage across said non-linear element remains substantially constant even if the current of the booster source varies.

References Cited in the file of this patent

UNITED STATES PATENTS

| | | |
|---|---|---|
| 2,715,656 | Andrews | Aug. 16, 1955 |
| 2,715,658 | Dunlap et al. | Aug. 16, 1955 |
| 2,774,822 | Dunlap et al. | Dec. 18, 1956 |
| 2,894,072 | Abbott et al. | July 7, 1959 |
| 2,944,115 | Henquet et al. | July 5, 1960 |